US012657549B2

(12) United States Patent
Bitton

(10) Patent No.: US 12,657,549 B2
(45) Date of Patent: Jun. 16, 2026

(54) METHOD AND SYSTEM FOR PROCESSING ALUMINUM ALLOY RIMS USING RIM SERIAL NUMBERS

(71) Applicant: House of Metals Company Limited, Toronto (CA)

(72) Inventor: Daniel Bitton, Toronto (CA)

(73) Assignee: HOUSE OF METALS COMPANY LIMITED, Toronto (CA)

( * ) Notice: Subject to any disclaimer, the term of this patent is extended or adjusted under 35 U.S.C. 154(b) by 159 days.

(21) Appl. No.: 18/374,054

(22) Filed: Sep. 28, 2023

(65) Prior Publication Data

US 2024/0020639 A1      Jan. 18, 2024

Related U.S. Application Data

(63) Continuation of application No. 17/589,938, filed on Feb. 1, 2022, now Pat. No. 11,823,125.

(60) Provisional application No. 63/145,246, filed on Feb. 3, 2021.

(51) Int. Cl.
| | |
|---|---|
| *G06Q 10/087* | (2023.01) |
| *B21K 1/38* | (2006.01) |
| *B24B 39/00* | (2006.01) |
| *G06Q 50/04* | (2012.01) |

(52) U.S. Cl.
CPC .............. *G06Q 10/087* (2013.01); *B21K 1/38* (2013.01); *B24B 39/006* (2013.01); *G06Q 50/04* (2013.01)

(58) Field of Classification Search
CPC ...... G06Q 10/087; G06Q 50/04; G06Q 10/30; B21K 1/38; B24B 39/006; C22B 21/0007; B09B 3/35; Y02P 10/20
See application file for complete search history.

(56) References Cited

U.S. PATENT DOCUMENTS

| | | | |
|---|---|---|---|
| 7,416,142 | B2 | 8/2008 | Baker et al. |
| 10,220,418 | B2 | 3/2019 | Bitton |

(Continued)

FOREIGN PATENT DOCUMENTS

| CN | 107116037 A | 9/2017 |
|---|---|---|

OTHER PUBLICATIONS

Stefano Capuzzi, Preparation and Melting of Scrap in Aluminum Recycling: A Review, Apr. 8, 2018, Metals 2018, 8, 249, MDPI (Year: 2018).*

(Continued)

*Primary Examiner* — Aaron Tutor
(74) *Attorney, Agent, or Firm* — Smart & Biggar LP

(57) ABSTRACT

A method and system for processing aluminum alloy rims are provided, involving providing a feed of a plurality of aluminum alloy rims of different compositions, each aluminum alloy rim in the plurality of aluminum alloy rims having a serial number distinguishing that aluminum alloy rim from other aluminum alloy rims in the plurality of aluminum alloy rims, storing in a non-transient computer-readable memory, a plurality of aluminum alloy rim categories, dividing the feed of aluminum alloy rims into a plurality of batches of aluminum alloy rims by, for each rim in the feed of aluminum alloy rims, scanning that aluminum alloy rim to determine the serial number of that aluminum alloy rim; based on the serial number, operating a data processor to determine, from amongst the plurality of aluminum alloy rim categories, an aluminum alloy rim category for that aluminum alloy rim, wherein each batch of aluminum alloy rims in the plurality of batches of aluminum alloy rims corresponds to a category in the plurality of aluminum alloy rim categories; and then, allocating that aluminum alloy rim to the batch of aluminum alloy rims corresponding to that aluminum alloy rim category. After dividing the feed of aluminum alloy rims (Continued)

100

| |
|---|
| Providing a feed of a plurality of aluminum alloy rims of different compositions, each aluminum alloy rim having a serial number ⟋—102 |
| Storing in a non-transient computer-readable memory, a plurality of aluminum alloy rim categories ⟋—104 |
| Storing in the non-transient computer-readable memory, a plurality of aluminum alloy composition ranges for each aluminum alloy rim category ⟋—106 |
| Storing in the non-transient computer-readable memory, manufacturer records identifying a plurality of aluminum alloy rim manufacturers ⟋—108 |
| Dividing the feed of aluminum alloy rims into a plurality of batches of aluminum alloy rims by: ⟋—110 |
| Scanning that aluminum alloy rim to determine the serial number ⟋—110a |
| Operating a data processor to determine an aluminum alloy rim category ⟋—110b |
| Allocating that aluminum alloy rim to the batch of aluminum alloy rims corresponding to that aluminum alloy rim category ⟋—110c |
| Separately processing each batch of the plurality of batches of aluminum alloy rims ⟋—112 |
| Fragmenting the aluminum alloy rims of that batch into fragments ⟋—112a |
| Cleaning the fragments, including shot blasting the fragments ⟋—112b |
| Separately supplying the fragments of each batch for recycling ⟋—114 | into the plurality of batches of aluminum alloy rims, each batch of the plurality of batches of aluminum alloy rims are separately processed.

6 Claims, 9 Drawing Sheets

(56) References Cited

U.S. PATENT DOCUMENTS

| | | | | |
|---|---|---|---|---|
| 11,823,125 | B2 | 11/2023 | Bitton | |
| 2009/0321511 | A1* | 12/2009 | Browne ................ | H01M 10/54 |
| | | | | 705/308 |
| 2010/0056305 | A1* | 3/2010 | Hebert ................... | A63B 47/00 |
| | | | | 473/409 |
| 2019/0134672 | A1* | 5/2019 | Bitton ....................... | B07C 5/34 |

OTHER PUBLICATIONS

RTS, "The Complete Plastics Recycling Process", Oct. 12, 2020, www.rts.com/blog/the-complete-plastics-recycling-process-rts.
The International Search Report and The Written Opinion dated Mar. 31, 2022 in respect of PCT/CA2022/050140.
Capuzzi, Preparation and Melting of Scrap in Aluminum Recycling: A Review, Apr. 8, 2018, Department of Management and Engineering, University of Padova.

* cited by examiner

100

| | |
|---|---|
| Providing a feed of a plurality of  aluminum alloy rims of different compositions, each aluminum alloy rim having a serial number | 102 |

| | |
|---|---|
| Storing in a non-transient computer-readable memory, a plurality of aluminum alloy rim categories | 104 |

| | |
|---|---|
| Storing in the non-transient computer-readable memory, a plurality of aluminum alloy composition ranges for each aluminum alloy rim category | 106 |

| | |
|---|---|
| Storing in the non-transient computer-readable memory, manufacturer records identifying a plurality of aluminum alloy rim manufacturers | 108 |

Dividing the feed of aluminum alloy rims into a plurality of batches of aluminum alloy rims by: — 110

Scanning that aluminum alloy rim to determine the serial number — 110a

Operating a data processor to determine an aluminum alloy rim category — 110b

Allocating that aluminum alloy rim to the batch of aluminum alloy rims corresponding to that aluminum alloy rim category — 110c Separately processing each batch of the plurality of batches of aluminum alloy rims — 112

Fragmenting the aluminum alloy rims of that batch into fragments — 112a

Cleaning the fragments, including shot blasting the fragments — 112b

Separately supplying the fragments of each batch for recycling — 114

FIG. 1

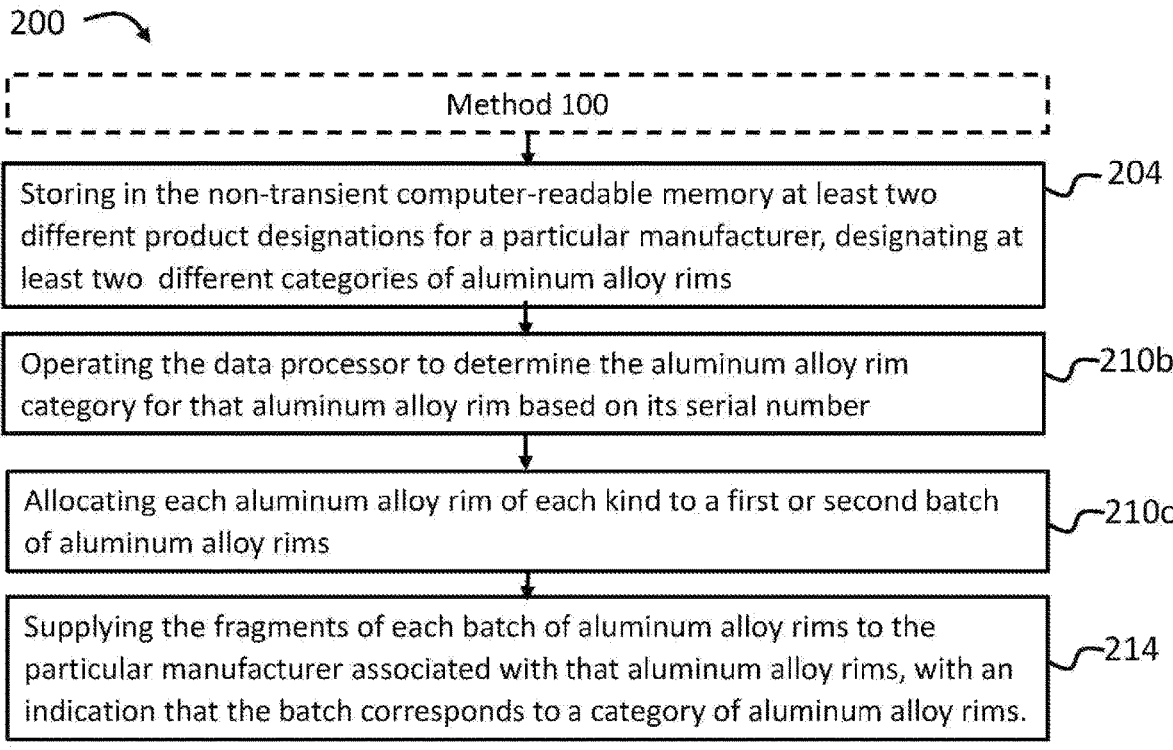

200

Method 100

Storing in the non-transient computer-readable memory at least two different product designations for a particular manufacturer, designating at least two different categories of aluminum alloy rims — 204

Operating the data processor to determine the aluminum alloy rim category for that aluminum alloy rim based on its serial number — 210b Allocating each aluminum alloy rim of each kind to a first or second batch of aluminum alloy rims — 210c Supplying the fragments of each batch of aluminum alloy rims to the particular manufacturer associated with that aluminum alloy rims, with an indication that the batch corresponds to a category of aluminum alloy rims. — 214

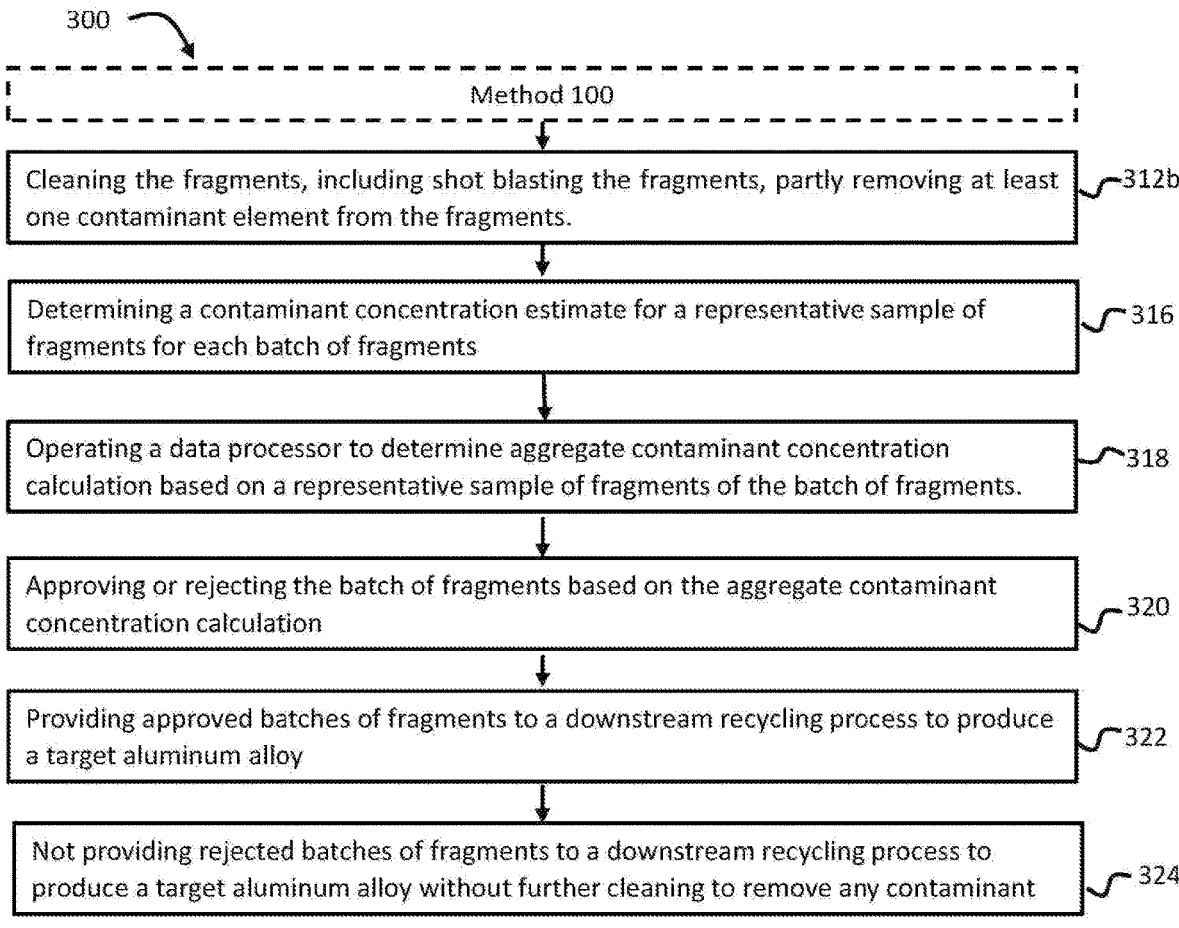

| Method 100 |

Cleaning the fragments, including shot blasting the fragments, partly removing at least one contaminant element from the fragments.                    ⌐312b Determining a contaminant concentration estimate for a representative sample of fragments for each batch of fragments                    ⌐316

Operating a data processor to determine aggregate contaminant concentration calculation based on a representative sample of fragments of the batch of fragments.                    ⌐318

Approving or rejecting the batch of fragments based on the aggregate contaminant concentration calculation                    ⌐320

Providing approved batches of fragments to a downstream recycling process to produce a target aluminum alloy                    ⌐322

Not providing rejected batches of fragments to a downstream recycling process to produce a target aluminum alloy without further cleaning to remove any contaminant                    ⌐324

FIG. 3

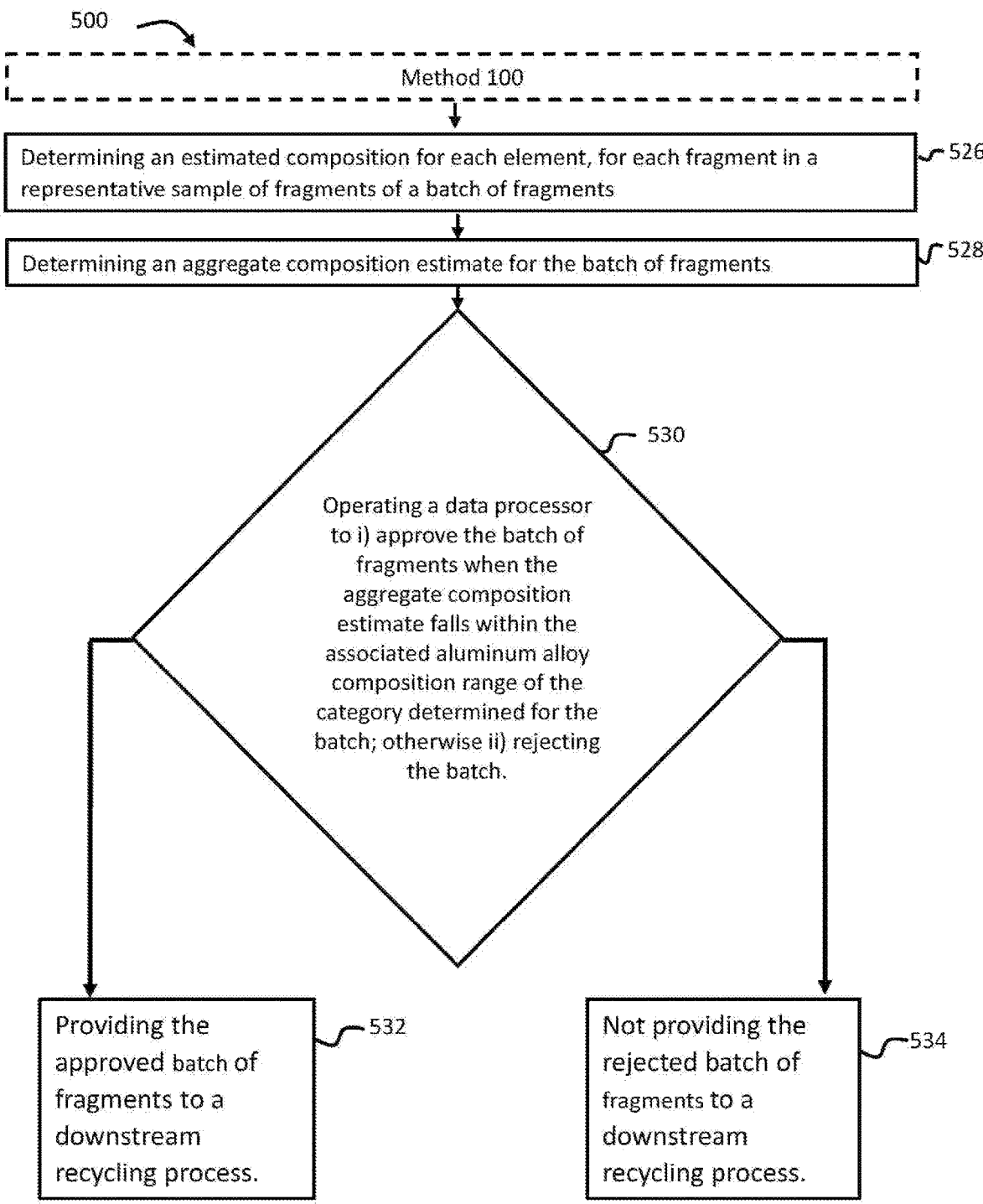

500

Method 100

Determining an estimated composition for each element, for each fragment in a representative sample of fragments of a batch of fragments          526

Determining an aggregate composition estimate for the batch of fragments          528

530

Operating a data processor to i) approve the batch of fragments when the aggregate composition estimate falls within the associated aluminum alloy composition range of the category determined for the batch; otherwise ii) rejecting the batch.

Providing the approved batch of fragments to a downstream recycling process.          532

Not providing the rejected batch of fragments to a downstream recycling process.          534

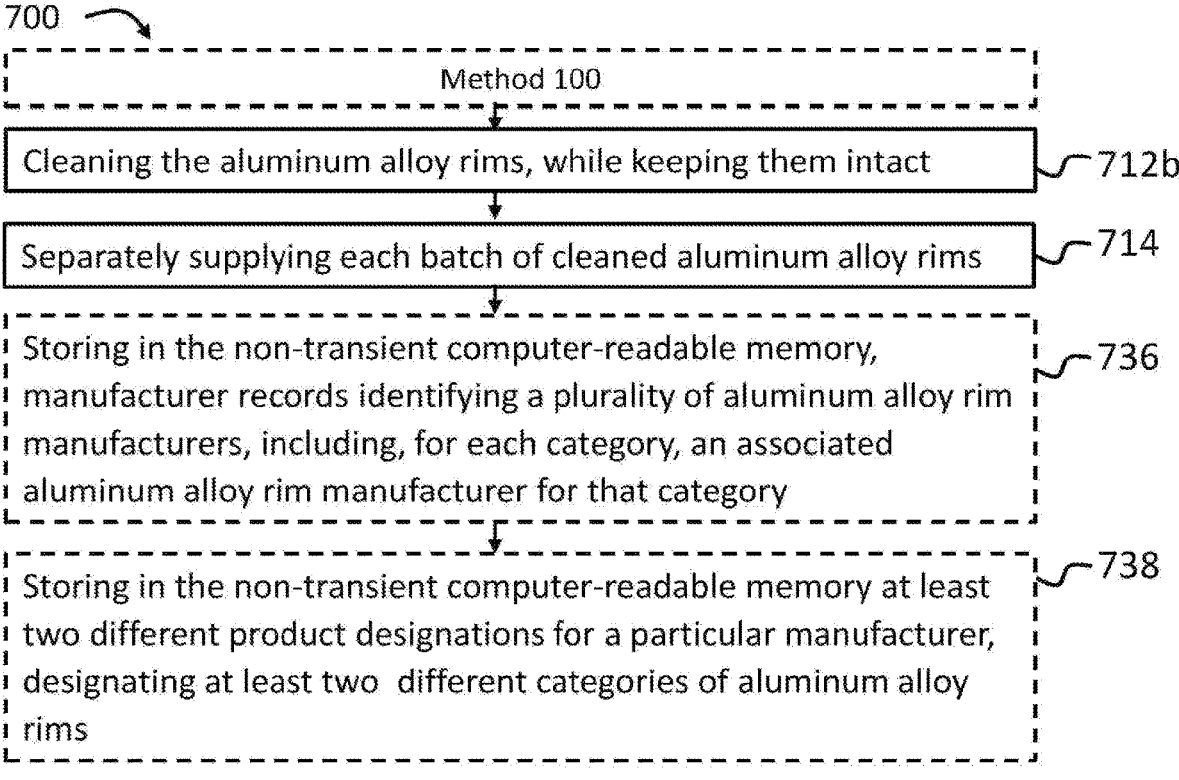

Method 100

Cleaning the aluminum alloy rims, while keeping them intact — 712b

Separately supplying each batch of cleaned aluminum alloy rims — 714

Storing in the non-transient computer-readable memory, manufacturer records identifying a plurality of aluminum alloy rim manufacturers, including, for each category, an associated aluminum alloy rim manufacturer for that category — 736

Storing in the non-transient computer-readable memory at least two different product designations for a particular manufacturer, designating at least two  different categories of aluminum alloy rims — 738

FIG. 7

METHOD AND SYSTEM FOR PROCESSING ALUMINUM ALLOY RIMS USING RIM SERIAL NUMBERS

CROSS REFERENCE TO RELATED APPLICATIONS

This application is a continuation of U.S. application Ser. No. 17/589,938 filed Feb. 1, 2022, which claims the benefit of U.S. Provisional Application No. 63/145,246 filed Feb. 3, 2021, the contents of each of which are incorporated herein by reference in their entirety.

FIELD

The described embodiments relate to the field of processing aluminum alloy rims, and, in particular, to the use of aluminum alloy rim serial numbers during the course of processing and or recycling.

BACKGROUND

Recycling what would otherwise be waste materials to form new materials or objects is important in modern waste management. Many different materials can be recycled, for example, glass, paper, cardboard, metal, plastic, tires, textiles, batteries, and electronics. The typical method for recycling waste material includes pickup, sorting, cleaning, and processing.

Metals are of particular value for recycling. Unlike other materials, metals may be recycled into products of substantially similar quality to their feed material.

Slight differences in elemental composition can result in vastly different material properties. Certain high value alloys have specific elemental compositions. Metals provided for recycling may have discrepancies in elemental composition from high value alloys. Additionally, metals provided for recycling may have unknown compositions. When waste metal is provided for recycling with identifying indicia, such as a serial number, it may be advantageous to utilize this indicia to improve the recycling process by grouping like products together, or determining attributes of the waste metal by analyzing attributes of the indicia.

SUMMARY

This summary is intended to introduce the reader to various aspects of the applicant's teaching, but not to define any specific embodiments. In general, disclosed herein are one or more methods of recycling waste metal.

In a first aspect, some embodiments of the invention provide a method of processing aluminum alloy rims, the method comprising: (1) providing a feed of a plurality of aluminum alloy rims of different compositions, each aluminum alloy rim in the plurality of aluminum alloy rims having a serial number distinguishing that aluminum alloy rim from other aluminum alloy rims in the plurality of aluminum alloy rims; (2) storing in a non-transient computer-readable memory, a plurality of aluminum alloy rim categories; (3) dividing the feed of aluminum alloy rims into a plurality of batches of aluminum alloy rims by, for each rim in the feed of aluminum alloy rims, scanning that aluminum alloy rim to determine the serial number of that aluminum alloy rim; (4) based on the serial number, operating a data processor to determine, from amongst the plurality of aluminum alloy rim categories, an aluminum alloy rim category for that aluminum alloy rim, wherein each batch of aluminum alloy rims in the plurality of batches of aluminum alloy rims corresponds to a category in the plurality of aluminum alloy rim categories; and (5), allocating that aluminum alloy rim to the batch of aluminum alloy rims corresponding to that aluminum alloy rim category; (6) after dividing the feed of aluminum alloy rims into the plurality of batches of aluminum alloy rims, separately processing each batch of the plurality of batches of aluminum alloy rims.

In some embodiments, for each batch of aluminum alloy rims of the plurality of batches of aluminum alloy rims, separately processing that batch includes fragmenting the aluminum alloy rims of that batch into fragments, and then cleaning the fragments, the cleaning including shot blasting the fragments; and then, the method further includes, for each batch of the plurality of batches of aluminum alloy rims, separately supplying the fragments of that batch for recycling.

In some embodiments, the method further includes storing in the non-transient computer-readable memory, a plurality of aluminum alloy composition ranges, the plurality of aluminum alloy composition ranges comprising, for each category in the plurality of categories of aluminum alloy rims, an associated aluminum alloy composition range for that category, the associated aluminum alloy composition range for that category comprising, for each element in a plurality of elements, an element range for that element.

In some embodiments, the method further includes storing in the non-transient computer-readable memory, manufacturer records identifying a plurality of aluminum alloy rim manufacturers, the plurality of aluminum alloy rim manufacturers including, for each category in the plurality of categories of aluminum alloy rims, an associated aluminum alloy rim manufacturer for that category, wherein for each batch of the plurality of batches of aluminum alloy rims, separately supplying the fragments of that batch for recycling to produce an aluminum alloy product, includes supplying the fragments of that batch to the associated aluminum alloy rim manufacturer for the category corresponding to that batch.

In some embodiments, the method further includes, (1) for a particular manufacturer in the plurality of aluminum alloy rim manufacturers, storing in the non-transient computer-readable memory at least two different product designations for designating at least two different categories of aluminum alloy rims in the plurality of aluminum alloy rims; wherein, the at least two different product designations comprise a first product designation for designating a first category of aluminum alloy rims produced by that particular manufacturer, and a second product designation for designating a second category of aluminum alloy rims produced by that particular manufacturer, the first category of aluminum alloy rims and the second category of aluminum alloy rims being different categories in the plurality of aluminum alloy rim categories; (2) for each rim in the feed of aluminum alloy rims, operating the data processor to determine the aluminum alloy rim category for that aluminum alloy rim based on its serial number, includes, for at least a first kind of aluminum alloy rims in the plurality of aluminum alloy rims and for at least a second kind of aluminum alloy rims in the plurality of aluminum alloy rims, determining the first category of aluminum alloy rims for the first kind of aluminum alloy rims and the second category of aluminum alloy rims for the second kind of aluminum alloy rims; (3) for each rim in the first kind of aluminum alloy rims, allocating that aluminum alloy rim includes allocating that aluminum alloy rim to the first batch of aluminum alloy rims; (4) for each rim in the second kind of aluminum alloy rims, allocating that aluminum alloy rim includes allocating that aluminum alloy rim to the second batch of aluminum alloy rims; (5) supplying the fragments of the first batch and the fragments of the second batch to the particular manufacturer includes providing the first batch to the particular manufacturer together with an indication that the first batch corresponds to the first category, and separately providing the second batch to the particular manufacturer together with an indication that the second batch corresponds to the second category.

In some embodiments, wherein, for each batch of the plurality of batches of aluminum alloy rims, shot blasting the fragments includes at least partly removing at least one contaminant element from the fragments, and then the method further includes: (1) for each fragment of a representative sample of fragments of that batch of fragments, determining, for each contaminant element of the at least one contaminant element, a contaminant concentration estimate for that fragment; (2) operating the data processor to i) determine an aggregate contaminant concentration calculation for that batch of fragments based on, for each contaminant element of the at least one contaminant element, and for each fragment of the representative sample of fragments, the contaminant concentration estimate for that contaminant element in that fragment, and then ii) either approve or reject that batch of fragments, based on the aggregate contaminant concentration calculation; (3) when that batch of fragments is approved, providing that batch of fragments to a downstream recycling process to produce a target aluminum alloy; and (4) when that batch of fragments is rejected, not providing that batch of fragments to the downstream recycling process to produce the target aluminum alloy without further cleaning to further remove any contaminant in the at least one contaminant element.

In some embodiments, the method further includes storing in the non-transient computer-readable memory, a plurality of contaminant composition ranges, the plurality of contaminant composition ranges comprising, for each category in the plurality of categories of aluminum alloy rims, an associated contaminant composition range for that category; wherein, each contaminant composition range in the plurality of contaminant composition ranges specifies at least one maximum contaminant concentration comprising a maximum contaminant concentration for each contaminant of the at least one contaminant; and, for each batch of the plurality of batches of aluminum alloy rims, shot blasting the fragments includes at least partly removing the at least one contaminant element from the fragments.

In some embodiments, for each batch of the plurality of batches of aluminum alloy rims, after shot blasting that batch of fragments, the method further includes: (1) for each fragment of a representative sample of fragments of that batch of fragments, determining, for each contaminant element of the at least one contaminant element, a contaminant concentration estimate for that fragment; (2) operating a data processor to either approve or reject that batch of fragments, based on i) the at least one maximum contaminant concentration specified by the associated aluminum alloy composition range for the aluminum alloy rim category corresponding to that batch, and ii) an aggregate contaminant concentration calculation for that batch of fragments, the aggregate contaminant concentration calculation being based on, for each contaminant element of the at least one contaminant element, and for each fragment of the representative sample of fragments, the contaminant concentration estimate for that contaminant element in that fragment; (3) when that batch of fragments is approved, providing that batch of fragments to a downstream recycling process to produce a target aluminum alloy; and (4) when that batch of fragments is rejected, not providing that batch of fragments to the downstream recycling process to produce the target aluminum alloy without further cleaning to further remove a contaminant element of the at least one contaminant element.

In some embodiments, wherein, for each batch of the plurality of batches of aluminum alloy rims, after shot blasting that batch of fragments, the method further includes (1) determining a plurality of estimated compositions by, for each fragment of a representative sample of fragments of that batch of fragments determining an estimated composition for that fragment comprising for each element in the plurality of elements, a concentration estimate for that element in that fragment; (2) determining from the plurality of estimated compositions, an aggregate composition estimate for the plurality of shot blasted pieces, the aggregate composition estimate comprising a plurality of element concentration estimates comprising an element concentration estimate for each element in the plurality of elements; (3) operating a data processor to approve that batch of fragments when the aggregate composition estimate for the plurality of shot blasted pieces falls within the associated aluminum alloy composition range of the category determined for that batch; and (4) otherwise reject the fragments; (5) when that batch of fragments is approved, providing that batch of fragments to a downstream recycling process to produce a target aluminum alloy; and (6) when that batch of fragments is rejected, not providing that batch of fragments to the downstream recycling process to produce the target aluminum alloy.

In some embodiments, the method further includes, for each contaminant element in the at least one contaminant element, and for each contaminant composition range of the plurality of contaminant composition ranges, defining a maximum threshold based at least partly on the maximum contaminant concentration for that contaminant element in that contaminant composition range; wherein, for each batch of the plurality of batches of aluminum alloy rims, (1) the aggregate contaminant concentration calculation for that batch of fragments includes at least one aggregate concentration estimate for the batch of fragments, the at least one aggregate concentration estimate comprising, for each contaminant element in the at least one contaminant element, an aggregate concentration estimate for that element in that batch of fragments; (2) operating the data processor to either approve or reject that batch of fragments includes determining, for each contaminant element in the at least one contaminant element, when the maximum threshold for that contaminant element is exceeded by the aggregate contaminant concentration estimate for that contaminant element, such that the data processor approves the plurality of fragments when, for each contaminant element in the at least one contaminant element, the maximum threshold exceeds the concentration estimate for that contaminant element; and (3) the data processor rejects the plurality of fragments when the concentration estimate for any contaminant element of the at least one contaminant element exceeds the maximum threshold for that contaminant element. In some embodiments, the at least one contaminant element is at least two contaminant elements and includes at least a first contaminant element and a second contaminant element; and, for each fragment of the representative sample of fragments, determining, for each contaminant element of the at least two contaminant elements, the contaminant concentration estimate for that fragment, includes determining a first contaminant concentration estimate for the first contaminant in that fragment and a second contaminant concentration estimate for the second contaminant element in that fragment.

In some embodiments, the first contaminant element and the second contaminant element are selected from the group consisting of iron, nickel, chromium, silicon, lead, copper, and zinc.

In some embodiments, for each batch of the plurality of batches of aluminum alloy rims, providing the batch of fragments to the downstream recycling process further includes providing the batch of fragments with an indication of the at least two aggregate contaminant concentration estimates for the batch of fragments.

In some embodiments, for each fragment of the representative sample of fragments of the batch of fragments, determining, for each contaminant element of the at least one contaminant element, a contaminant concentration estimate for that fragment includes heating a material of the fragment to a point where the material will emit a characteristic radiation while cooling down, operating a sensor to detect that characteristic radiation, and operating a processor to analyze the characteristic radiation to determine the composition measurements of the material.

In some embodiments, the aggregate contaminant concentration calculation for the batch of fragments, includes at least two concentration variance estimates for the batch of fragments, the at least two concentration variance estimates comprising, for each contaminant element in the at least two contaminant elements, a concentration variance estimate for that contaminant element in the plurality of fragments; and, for each contaminant element in the at least two contaminant elements, the maximum threshold for that contaminant element is determined at least partly based on the concentration variance estimate for that contaminant element in the plurality of fragments.

In some embodiments, for each batch of aluminum alloy rims of the plurality of batches of aluminum alloy rims, separately processing that batch includes cleaning the aluminum alloy rims of that batch while keeping them intact; and then, the method further includes, for each batch of the plurality of batches of aluminum alloy rims, separately supplying the cleaned aluminum alloy rims of that batch.

In some embodiments, the method further includes storing in the non-transient computer-readable memory, manufacturer records identifying a plurality of aluminum alloy rim manufacturers, the plurality of aluminum alloy rim manufacturers including, for each category in the plurality of categories of aluminum alloy rims, an associated aluminum alloy rim manufacturer for that category, wherein for each batch of the plurality of batches of aluminum alloy rims, separately supplying the cleaned aluminum alloy rims of that batch includes supplying the cleaned aluminum alloy rims of that batch to the associated aluminum alloy rim manufacturer for the category corresponding to that batch.

In some embodiments, the method further includes, for a particular manufacturer in the plurality of aluminum alloy rim manufacturers, storing in the non-transient computer-readable memory at least two different product designations for designating at least two different categories of aluminum alloy rims in the plurality of aluminum alloy rims; wherein, the at least two different product designations comprise a first product designation for designating a first category of aluminum alloy rims produced by that particular manufacturer, and a second product designation for designating a second category of aluminum alloy rims produced by that particular manufacturer, the first category of aluminum alloy rims and the second category of aluminum alloy rims being different categories in the plurality of aluminum alloy rim categories, having different associated aluminum alloy composition ranges in the plurality of aluminum alloy composition ranges; for each rim in the feed of aluminum alloy rims, operating the data processor to determine the aluminum alloy rim category for that aluminum alloy rim based on its serial number, includes, for at least a first kind of aluminum alloy rims in the plurality of aluminum alloy rims and for at least a second kind of aluminum alloy rims in the plurality of aluminum alloy rims, determining the first category of aluminum alloy rims for the first kind of aluminum alloy rims and the second category of aluminum alloy rims for the second kind of aluminum alloy rims; for each rim in the first kind of aluminum alloy rims, allocating that aluminum alloy rim includes allocating that aluminum alloy rim to the first batch of aluminum alloy rims; for each rim in the second kind of aluminum alloy rims, allocating that aluminum alloy rim includes allocating that aluminum alloy rim to the second batch of aluminum alloy rims; and supplying the cleaned aluminum alloy rims of the first batch and the cleaned aluminum alloy rims of the second batch to the particular manufacturer includes providing the first batch to the particular manufacturer together with an indication that the first batch corresponds to the first category, and separately providing the second batch to the particular manufacturer together with an indication that the second batch corresponds to the second category.

In some embodiments, the method further includes, for each batch of aluminum alloy rims of the plurality of batches of aluminum alloy rims, estimating a refurbishment sales price of the aluminum alloy rims of that batch; estimating a recycled sales price of the aluminum alloy rims of that batch; and then based on the refurbishment sales price or the recycled sales price, performing one and only one of refurbishing and recycling, wherein the refurbishing includes separately cleaning the aluminum alloy rims of that batch while keeping them intact; and then separately supplying the cleaned aluminum alloy rims of that batch; the recycling includes fragmenting the aluminum alloy rims of that batch into fragments, and then cleaning the fragments, the cleaning including shot blasting the fragments; and then separately supplying the fragments of that batch for recycling.

According to some aspects, a system for processing aluminum alloy rims, includes (1) an aluminum alloy rim transfer mechanism for providing a feed of a plurality of aluminum alloy rims of different compositions and for dividing the feed of aluminum alloy rims into a plurality of batches of aluminum alloy rims, each aluminum alloy rim in the plurality of aluminum alloy rims having a serial number distinguishing that aluminum alloy rim from other aluminum alloy rims in the plurality of aluminum alloy rims; (2) a computer-readable memory having stored thereon a plurality of aluminum alloy rim categories; (3) a scanner wherein, in operation and for each rim in the feed of aluminum alloy rims, the scanner scans that aluminum alloy rim to determine the serial number of that aluminum alloy rim; (4) a data processor linked for communication with the computer-readable memory and the scanner, wherein, in operation, for each rim in the feed of aluminum alloy rims, the scanner transmits the serial number to the data processor, and, based on the serial number and the plurality of aluminum alloy rim categories, the data processor then determines, from amongst the plurality of aluminum alloy rim categories, an aluminum alloy rim category for that aluminum alloy rim, wherein each batch of aluminum alloy rims in the plurality of batches of aluminum alloy rims corresponds to a category in the plurality of aluminum alloy rim categories; and, (5) downstream processing equipment for receiving and separately processing each batch of the plurality of batches of aluminum alloy rims.

In some embodiments, the downstream processing equipment fragments the aluminum alloy rims of that batch into fragments, and then shot blasts the fragments.

In some embodiments, the computer-readable memory has stored thereon a plurality of aluminum alloy composition ranges, the plurality of aluminum alloy composition ranges comprising, for each category in the plurality of categories of aluminum alloy rims, an associated aluminum alloy composition range for that category, the associated aluminum alloy composition range for that category comprising, for each element in a plurality of element, an element range for that element.

In some embodiments, the computer-readable memory has stored thereon manufacturer records identifying a plurality of aluminum alloy rim manufacturers, the plurality of aluminum alloy rim manufacturers including, for each category in the plurality of categories of aluminum alloy rims, an associated aluminum alloy rim manufacturer for that category In some embodiments, for a particular manufacturer in the plurality of aluminum alloy rim manufacturers, the computer-readable memory has stored thereon at least two different product designations for designating at least two different categories of aluminum alloy rims in the plurality of aluminum alloy rims; wherein, the at least two different product designations comprise a first product designation for designating a first category of aluminum alloy rims produced by that particular manufacturer, and a second product designation for designating a second category of aluminum alloy rims produced by that particular manufacturer, the first category of aluminum alloy rims and the second category of aluminum alloy rims being different categories in the plurality of aluminum alloy rim categories; for each rim in the feed of aluminum alloy rims, the data processor, in operation, determines the aluminum alloy rim category for that aluminum alloy rim based on its serial number, by, for at least a first kind of aluminum alloy rims in the plurality of aluminum alloy rims and for at least a second kind of aluminum alloy rims in the plurality of aluminum alloy rims, determining the first category of aluminum alloy rims for the first kind of aluminum alloy rims and the second category of aluminum alloy rims for the second kind of aluminum alloy rims; for each rim in the first kind of aluminum alloy rims, the aluminum alloy rim transfer mechanism allocating that aluminum alloy rim includes allocating that aluminum alloy rim to the first batch of aluminum alloy rims; and, for each rim in the second kind of aluminum alloy rims, aluminum alloy rim transfer mechanism allocating that aluminum alloy rim includes allocating that aluminum alloy rim to the second batch of aluminum alloy rims. In some embodiments, the system further includes a composition analyzer for, in operation, for each batch of the plurality of batches of aluminum alloy rims, and for each fragment of a representative sample of fragments of that batch of fragments, determining, for each contaminant element of the at least one contaminant element, a contaminant concentration estimate for that fragment, the composition analyser being linked for electronic communication with the data processor; wherein, in operation, for each batch of the plurality of batches of aluminum alloy rims, the downstream processing equipment shot blasting the fragments includes at least partly removing at least one contaminant element from the fragments; and, the data processor i) determines an aggregate contaminant concentration calculation for that batch of fragments based on, for each contaminant element of the at least one contaminant element, and for each fragment of the representative sample of fragments, the contaminant concentration estimate for that contaminant element in that fragment; and ii) either approves or rejects that batch of fragments, based on the aggregate contaminant concentration calculation for that batch of fragments, the aggregate contaminant concentration calculation being based on, for each contaminant element of the at least one contaminant element, and for each fragment of the representative sample of fragments, the contaminant concentration estimate for that contaminant element in that fragment.

In some embodiments, each aluminum alloy composition range in the plurality of aluminum alloy composition ranges specifies at least one maximum contaminant concentration comprising a maximum contaminant concentration for each contaminant of the at least one contaminant; and in operation, for each batch of the plurality of batches of aluminum alloy rims, the data processor approves or rejects that batch of fragments based on the aggregate contaminant concentration calculation for that batch of fragments and the at least one maximum contaminant concentration.

In some embodiments, the composition analyzer includes a radiation emitter for heating a material of each rim in at least one spot on a surface of that rim to a point where the material will emit a characteristic radiation while cooling down, a sensor for detecting and measuring that characteristic radiation, and a processor for determining from that characteristic radiation a composition of the material.

In some embodiments, the composition analyzer is a laser-induced breakdown spectroscopy composition analyzer.

In some embodiments, the aluminum alloy rim transfer mechanism includes at least one of: a conveyor, a pick-and-place unit, and a robotic arm.

In some embodiments, the system further includes a plurality of paths of travel for the feed of the plurality of aluminum alloy rims downstream from the scanner, wherein each rim in the plurality of aluminum alloy rims is transported along a selected path of travel in the plurality of paths of travel based on the batch in the plurality of batches of aluminum alloy rims selected by the processor for that rim.

BRIEF DESCRIPTION OF THE DRAWINGS

These and other advantages of the instant invention will be more fully and completely understood in conjunction with the following detailed description of embodiments and aspects of the present invention with reference to the following drawings, in which:

FIG. 1, in a flow chart, illustrates a method of processing aluminum alloy rims.

FIG. 2, in a flow chart, illustrates a method of processing aluminum alloy rims.

FIG. 3, in a flow chart, illustrates a method of processing aluminum alloy rims.

FIG. 5, in a flow chart, illustrates a method of processing aluminum alloy rims.

FIG. 7, in a flow chart, illustrates a method of processing aluminum alloy rims.

DESCRIPTION OF EXEMPLARY EMBODIMENTS

Figure 4:
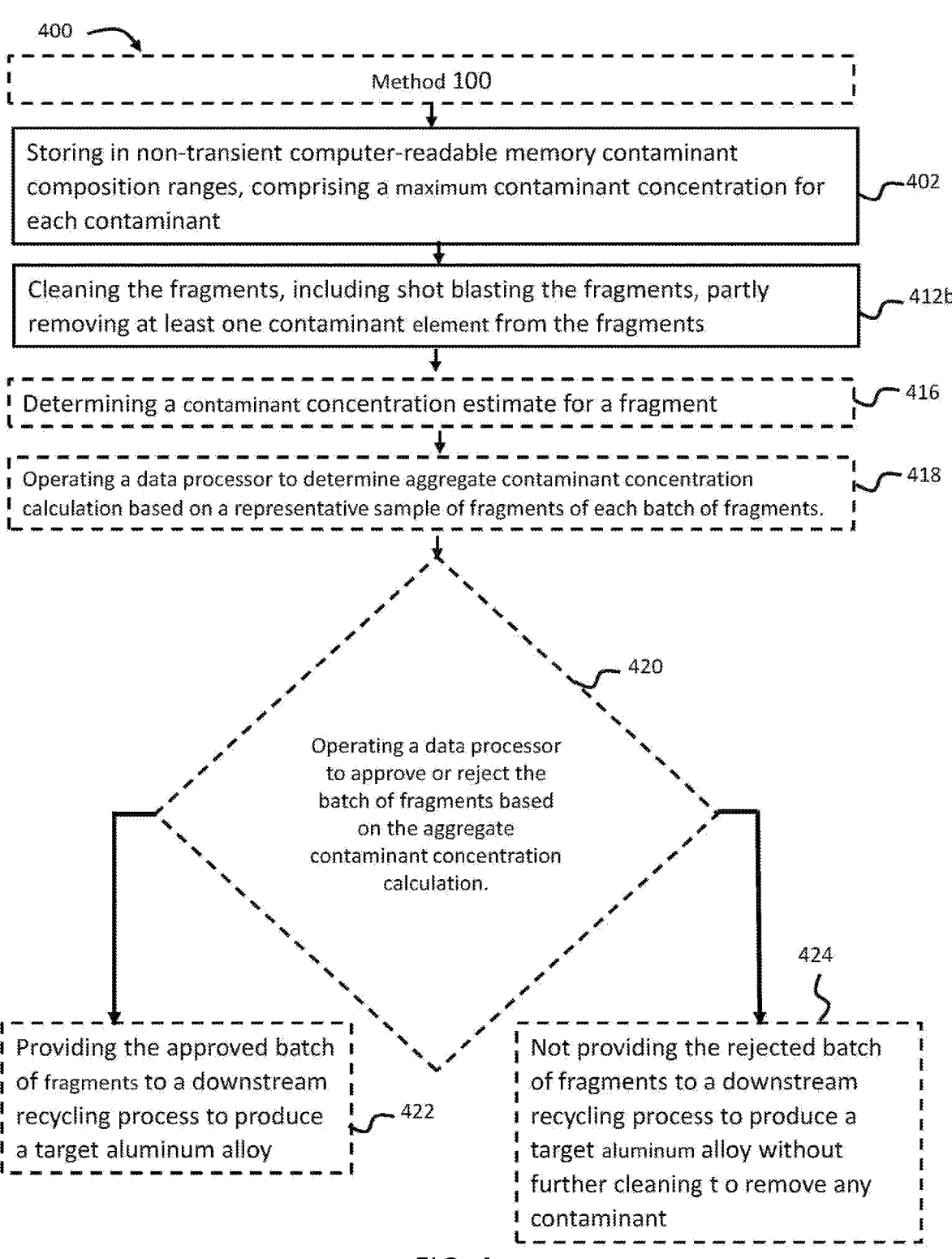
FIG. 4, in a flow chart, illustrates a method of processing aluminum alloy rims.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

Reference is first made to FIG. 1, in which a method 100 for processing aluminum alloy rims is shown. Method 100 begins with providing a plurality of aluminum alloy rims of different compositions at step 102. Although each rim comprises an aluminum alloy, the specific elemental composition of one rim may differ from the composition of other rims in the feed. For example, one rim may be made of an A356.2 aluminum alloy, while another rim may be made of a different aluminum alloy Even if two rims are made of the same alloy, the specific compositions may differ. For example, Eccomelt 356.2 has the following elemental composition ranges: Si: 6.5%-7.5%, Cu: 0%-0.02%, Fe: 0%-0.014%, Mg: 0.25%-0.4%, Zn: 0%-0.018%, Mn: 0%-0.03%, Ni: 0%-0.008%, Cr: 0%-0.03%, Sn: 0%-0.01% Ti: 0%-0.15% Sr: 0%-0.02% Al: 0%-91.674%. Two products both made of Eccomelt 356.2 may differ slightly in specific composition, provided they both fall within the specified composition ranges.

The aluminum alloy rims provided at step 102 each have a serial number that may distinguish each rim from other rims in the plurality. Serial numbers may be printed onto, or inscribed into, the surface of the rim.

At step 104, a plurality of aluminum alloy rim categories are stored in a non-transient computer-readable memory. The aluminum alloy rim categories may include rims produced by the same manufacturer, rims of the same product designation, rims of the same alloy, rims of the same manufacturing batch, age, surface treatment, coating, or other attributes that may be used to group rims together.

At step 110, aluminum alloy rims are divided into a plurality of batches of aluminum alloy rims. At step 110*a*, aluminum alloy rims are scanned to determine the serial number of each aluminum alloy rim. In some examples of step 110*a*, rims may be scanned by a visible light camera. The visible light camera may capture still or continuous images. From these images, the serial number associated with each rim may be determined. In some examples, the images may be reviewed by a human operator to determine the associated serial number. In other examples, a data processor may be operated to programmatically determine the serial numbers from the still or continuous image data. In some examples, the data processor may process captured image data in real time. In other examples, the data processor may begin to process collected data only when the collection of image data is complete.

In other examples, other sensor types may be used to determine the serial number of each aluminum rim. These other sensor types may include IR sensors, barcode scanners, stereoscopic image sensors, or any other sensor known in the art that may capture a serial number inscribed into or printed on a metal surface.

In some examples, rims may be automatically scanned, such that when a feed of aluminum alloy rims is passed through a certain area, the serial numbers of all the rims may be determined. In other examples, a human operator may pre-process the rims to promote scanning, such as positioning rims in a manner such that all serial numbers are facing the direction of a sensor. In other examples, a human operator may operate a handheld scanning apparatus, manipulating the scanner such that each rim is scanned sequentially. For each rim, the scanner is positioned such that the serial number of the rim is within the field of view of the scanner's sensor. Once a rim is scanned, the operator will move onto the next rim.

In some examples, serial numbers once scanned may be stored in non-transient computer-readable memory, and each associated to a specific rim.

At step 110*b*, a data processor is operated to determine an aluminum alloy rim category from the categories stored in step 104 for each aluminum rim based on its serial number. The data processor may access a database stored in non-transient computer-readable memory. The database may include aluminum alloy rim categories stored at step 104, and serial numbers that correspond to each category. For example, lists of serial numbers may be received from different manufacturers and each list may be stored in connection with a specific manufacturer. For manufacturers that produce different kinds of aluminum alloy rims made of aluminum alloys that may differ in composition, multiple lists of serial numbers may be stored for that manufacturer, including, for each different kind of aluminum alloy rim, a separate list of serial numbers i for that kind of aluminum alloy rim. The data processor may compare the value of the serial number determined at step 110*b* to known serial numbers that correspond to aluminum alloy rim categories. If the determined serial number is equal to a serial number stored in non-transient computer-readable memory corresponding to a category of aluminum alloy rim category, the rim associated with the determined serial number may be associated with the aluminum alloy rim category. Alternatively, a database may use an algorithm to determine if a serial number corresponds to a certain category (for example, a portion of the serial number may be found indicate a particular manufacturer or a particular product line produced by a particular manufacturer, or the format of the serial number may uniquely identify a particular manufacturer, or a particular product line produced by a particular manufacturer). The data processor may perform an operation on the serial number determined at step 110*a* for each category for which a formula is associated. The output of each operation may indicate whether a determined serial number is associated with an aluminum alloy rim category.

At step 110*c*, aluminum alloy rims are allocated to batches according to the aluminum alloy rim category determined at step 110*b*. In some examples, rims may be physically separated, such that each rim batch is stored in a separate area or in a separate container. In other embodiments, different batches can be otherwise isolated from one another to impede contamination.

Aluminum alloy rim batches are allocated into the plurality of batches of aluminum alloy rims. In some examples, rims are allocated into physically separate batches. Aluminum alloy rims may then be processed by batch. As each batch may have different characteristics, such as alloy type, elemental composition, manufacturer, coatings, age, or other characteristics, corresponding to the previously determined aluminum alloy rim category, each batch can be processed in a manner suitable for the characteristics of its associated category. In some examples, a batch may comprise rims with an anodized surface from a certain manufacturer. These rims may be processed in a first manner. Another batch may comprise rims without anodized surfaces. This batch may be processed in a second manner.

Some examples of method 100 may further comprise step 114 and step 112 may further comprise step 112a and 112b.

At step 112a, when separately processing each batch of the plurality of batches of aluminum alloy rims, the aluminum alloy rims are fragmented into fragments. In some examples, fragments may be produced by passing aluminum alloy rims through a fragmenting unit. A fragmenting unit may be a shredding apparatus. Any suitable shredder known in the art may be used. For example, aluminum alloy rims may be supplied to a hopper of a conventional shredding apparatus, such as the SSI Series 45H shredder available from SSI Shredding Systems Inc. at 9760 SW Freeman Drive, Wilsonville, Oreg., 97070-9286, USA. This shredding apparatus may include a cutter box housing cutters, which can be mounted on parallel shafts that rotate horizontally in opposite directions. The feed hopper can be located above the cutter box. Due to gravity, the aluminum alloy rims placed in the feed hopper can then be fed downwardly into the proper location where they can be engaged by the cutters and torn or cut into shreds.

The size of fragments produced during step 112a may vary depending on the design and configuration of the fragmenting unit, for example, the size, spacing and orientation of shredders or cutters.

At step 112b, the fragments produced at step 112a are cleaned. The cleaning step comprises shot blasting the fragments. That is, the cleaning unit may comprise a shot blasting apparatus. Additionally, each fragment may be subjected to, at the cleaning station, manual hand cleaning by a worker, water blasting, sand blasting, laser cleaning, a washing process, and/or wire brush grinding. In some exemplary methods, at least a portion of the plurality of fragments may be subjected to more than one form of cleaning during the cleaning process.

When using shot blasting, for example, during the cleaning process 112b, abrasive particles, i.e. a plurality of shot, can be projected at the fragments at high speed. The shot impacting the surfaces of the fragments can dislodge coatings, corrosion, and debris, i.e., contaminant elements, deposited on the surfaces of the fragments, resulting in fragments with surfaces largely free from contamination.

Shot blasting may be conducted in any suitable shot blasting apparatus. For example, the apparatus may be a centrifugal blasting apparatus, such as the model (FB-4/28/E/MR) Flexbel system available from BCP Wheelabrator of 1219 Corporate Drive, Burlington, Ontario, L7L 5V5, Canada, which is suitable for blast cleaning small parts. Abrasives may include steel shot, alumina, silica, and other abrasive materials.

Within step 112b, the plurality of shot blasted fragments may be separated from the plurality of shot (depending on the form of cleaning that is used, other similar separation steps may be conducted). It may be desirable to separate the plurality of fragments from the plurality of shot because including the shot in the aggregate batch might skew the aggregate batch composition so that this batch has contaminant concentrations too high for the batch to be used in making some valuable alloys.

At step 114, the fragments of each batch are separately supplied for recycling. Each batch corresponds to a different aluminum alloy rim category having specific characteristics, such as rims produced by the same manufacturer, rims of the same product designation, rims of the same alloy, rims of the same manufacturing batch, age, surface treatment, coating, or other attributes that may be used to group rims together. Characteristics may alter the recycling value of each batch. For example, rims made of a high value alloy may be recycled into the high value alloy, commanding a higher price. Rims made of lower value alloys, or alloys with unknown compositions may be recycled using a different process.

Some examples of method 100 may further comprise step 106, wherein for each aluminum alloy rim category, an aluminum alloy composition range is stored in non-transient computer-readable memory, the composition range comprising, for each element in a plurality of elements, an element range for that element. For example, a category of aluminum alloy rims may have an associated composition range. An aluminum alloy category may be A356.2 aluminum alloy. The associated composition range comprises elemental composition ranges for A356.2 aluminum alloy.

Some examples of method 100 may further comprise step 108, wherein manufacturer records identifying a plurality of aluminum alloy rim manufacturers, such that a manufacturer is associated with each aluminum rim category, are stored in non-transient computer-readable memory. In methods including step 108, when aluminum alloy rims are assigned to a category at step 110c, rims can be associated with an aluminum alloy manufacturer.

In examples of method 100 comprising step 108, step 114, separately supplying the fragments of each batch for recycling may comprise supplying a batch of fragments for recycling wherein the batch is associated with one aluminum alloy rim manufacturer. Grouping fragments by manufacturer may be advantageous in situations wherein the manufacturer has a well-known reputation for quality control. In some examples, a manufacturer may manufacture rims only of one certain alloy, with a very specific elemental composition range, resulting in a recycling feedstock with known material composition. In other examples, when two batches of rims of the same alloy are provided, each batch may have differing compositions. Further grouping rims into batches by manufacturer may result in batches with more specific compositions for a given alloy type. In some examples, additional measures can be taken to isolate different batches intended for different manufacturers from one another, to prevent inadvertent contamination of one batch by materials from another batch. For example, without limitation, each batch may be separately sealed into one or more containers to impede contamination by materials not belonging to that batch. In another example, different batches may be stored in different locations to impede contamination.

Referring now to FIG. 2, pictured therein is method 200 of processing aluminum alloy rims. Method 200 may include any of the steps included in method 100, and additionally comprises steps 204, 210b, 210c and 214.

At step 204, at least two different product designations, for designating at least two different categories of aluminum alloy rims for a particular manufacturer are stored in non-transient, computer-readable memory. In some examples, product designations may include rims of a specific alloy, style, size, surface treatment, age or other characteristics. Product designations stored at step 204 correspond to an aluminum alloy rim category stored in memory at step 104 described above. The at least two different product designations stored at step 204 correspond to two different aluminum alloy rim categories. In some examples, more than two product designations may be stored. It is possible that within this set of more than two product designations stored, two product designations may correspond to the same aluminum alloy rim category. For example, product designation A1, product designation A2, and product designation B1, all produced by manufacturer ABC may correspond to only two aluminum alloy rim categories as stored at step 104. A1 and A2 may correspond to example category 1, while B1 may correspond to example category 2.

At step 210*b*, a data processor is operated to determine the aluminum alloy rim category for that aluminum alloy rim based on its serial number. Aluminum alloy rims of at least a first kind and a second kind are provided at step 102 of method 200. Each kind of aluminum alloy rim may be associated with a certain product designation as stored in memory at step 204. The serial number of a first kind of rim is determined as described at step 110*a*. The serial number of a second kind of rim is determined as described at step 110*a*. A data processor is then operated, as described for step 110*b* to determine the aluminum alloy rim category associated with each kind of rim. The first kind of rim is associated with a first aluminum alloy rim category. The second kind of rim is associated with a second alloy rim category. For example, rim type A1 from manufacturer ABC and rim type B1 from manufacturer ABC may be provided. The serial number of each rim is scanned, then a data processor is operated to determine the associated aluminum alloy rim category for each kind of aluminum alloy rim, as described above in reference to method 100. For example, rim type A1 may be associated with category 1, while rim type B1 may be associated with category 2. All rims of each kind, each comprising the same product designation, may be associated with the same category. For example, all type A1 rims provided to method 200 may be associated with category 1, and all type B1 rims provided to method 200 may be associated with category 2.

At step 210*c*, aluminum alloy rims are allocated to a first or second batch of aluminum alloy rims. Each batch corresponds to an aluminum alloy rim category as described at step 110*c*. Additionally, each batch corresponds to a product designation as stored at step 204. Rims of each kind are allocated to separate batches. For example, all rims of type A1, all associated with category 1, are allocated to batch 1, and all rims of type B1, all associated with category 2, are allocated to batch 2. As described at step 110*c*, rims may be allocated to each batch by physically separating rims. In some examples, a human operator may separate rims into separate batches. In other examples, automated equipment, such as a conveyer system, or robotic arm, may automatically allocate rims into batches based on previously determined attributes.

In some examples of method 200, at step 210*c*, aluminum alloy rims may be allocated to more than two batches.

At step 214, fragments of each batch of aluminum alloy rims are supplied to the particular manufacturer associated with each category of each batch, as stored in memory at step 108. The first batch is provided to the manufacturer, along with an indication that the first batch corresponds to a first category of aluminum alloy rims. Separately, the second batch is provided to the manufacturer, along with an indication that the second batch corresponds to the second category. For example, rims of batch 1, are supplied to manufacturer ABC, along with an indication that rims of batch 1 correspond to aluminum alloy rim category 1, and rims of batch 2 are supplied to manufacturer ABC, along with an indication that rims of batch 2 correspond to category 2. In some examples, indications of rim category may be a physical indicator, such as a printed adhesive label attached to each rim in the batch, a painted indication or other physical indicators. In other examples, the indication provided with each batch at step 214 may be an electronic record, such as a stored value in non-transient computer-readable memory, or other electronic means of indication. In some examples, additional measures can be taken to isolate batches 1 and 2 from one another, to impede contamination of either batch by materials from the other batch. For example, without limitation, one or both batches may be separately sealed into one or more containers to impede contamination of one batch by materials not belonging to that batch. In another example, again without limitation, different batches may be separately shipped, in different shipments, to the manufacturer, to reduce the risk of confusion or contamination.

Referring now to FIG. 3, pictured therein is method 300 of processing aluminum alloy rims. Method 300 may include any of the steps of method 100 of FIG. 1, and additionally comprises steps 312*b*, 316, 318, 320, 322 and 324. Step 312*b* corresponds to step 112*b*, all description above in relation to step 112*b* applies to step 312*b* of method 300.

At step 312*b*, fragments are cleaned. The cleaning step includes shot blasting the fragments to remove at least one contaminant element from the fragments. it may be desirable to at least partially clean contaminant elements from the plurality of fragments to at least lower the concentrations of these contaminant elements in the batch composition if not remove these contaminant elements entirely. Including the contaminant elements in the batch may skew the aggregate batch composition such that this batch has contaminant concentrations too high for the batch to be used in making some valuable alloys, since material properties may be sensitive to elemental composition. Put another way, the feed of rim fragments has a batch composition that includes the contaminant elements and therefore may have a batch composition that is less desirable; whereas the cleaned plurality of fragments has a batch composition that includes relatively less contaminant elements and therefore may have a batch composition that is more desirable. Accordingly, it may be desirable to remove all contaminant elements to leave behind a bare metal surface, free of contaminant elements.

Example contaminant elements include, but are not limited to, coatings, such as paints, metal electroplating, ceramic coatings, or plastic coatings. Similarly, external surfaces of waste metal pieces may be characterized by corrosion or environmental contamination such as rust. Further, contaminants may be nuts, bolts, screws, steel bushings, etc. (i.e., foreign debris) that may be attached to the aluminum alloy rims.

At step 316, a contaminant concentration estimate is determined for each fragment in a representative sample of fragments of each batch of fragments. A contaminant concentration estimate is an estimate of the amount (by weight) of a contaminant element with respect to the weight of the fragment containing that contaminant element (for example on a surface of that fragment and/or affixed to that fragment). It is to be understood that elements not commonly found within the base alloy are not necessarily considered contaminant elements. Further, what is considered as a contaminant element may vary between recycling processes, depending on, for example, desired characteristics for the batch. That is, for example, in one recycling process of aluminum alloys, copper may be considered as a contaminant element, whereas in a second recycling process, copper may not be considered as a contaminant element.

Any method known in the art to measure the concentration of a contaminant with respect to a fragment to which that contaminant is affixed to and/or on a surface of, may be used. In some examples, a laser scanner can be used to measure the concentration of contaminants in a representative sample of fragments. This can involve using a laser to heat the material at a point on the surface of a representative fragment to a temperature at which that material will emit a characteristic radiation while cooling down. A sensor can then be operated to detect that characteristic radiation to provide a spectrum of signal magnitudes at different frequencies. This spectrum of signal magnitudes at different frequencies can then be analyzed by a computer processor to infer the relative concentrations of different elements within the alloy, as described, for example, in U.S. Pat. No. 10,220,418, incorporated herein by reference. If the type of base alloy is known (i.e., which elements are expected to be detected by the sensor), the computer processor can infer which elements are "contaminant elements" and which are "alloy elements". Accordingly, the concentration of contaminant elements can be estimated.

A single concentration measurement may be made for each fragment of the representative sample of fragments. The location of this measurement may affect the contaminant concentration estimate. For example, if a measurement is made directly on a rust spot, the contaminant concentration estimate may be different than if the measurement, on the same fragment, was made adjacent to the rust spot. Accordingly, in some examples, multiple concentration measurements may be made of each fragment of the representative sample of fragments. That said, the concentration measurements are to be understood as estimates. It is to be understood that if enough measurements are made on enough fragments, based on statistical analysis, an accurate estimate of the contaminant concentrations can be made.

In one example, a "Laser-Induced Breakdown Spectroscopy" ("LIBS") composition analyzer manufactured by Laser Distance Spectrometry can be adapted as the laser scanner and sensor. The LIBS composition analyzer may include a radiation emitter, such as an Nd:YAG laser. The laser may shine at a frequency ranging from 1 to 20 hertz, thereby raising the temperature of the fragments at the point of contact between the fragment and the laser to above 30,000 degrees Celsius and generating plasma. The plasma may quickly cool down, returning the energized ions to a low energy state. While returning to the low energy state, the ions may emit characteristic radiation. The LIBS composition analyzer may contain one or more sensors that detect the characteristic radiation. A processor may then analyze readings obtained from the sensors and determine from them the concentration of the constituents contained in the material undergoing the temperature change. The processor may be disposed within the composition analyzer. Alternatively, the processor may be a remote processor.

Other suitable composition analyzers may include composition analyzers that use laser spectroscopy or other systems that rely on other methods of inducing characteristic radiation to be emitted by a material of each fragment at a surface of that fragment and detecting and analyzing that characteristic radiation to determine a composition of that material. The composition analyzers may detect the characteristic radiation by using any suitable sensor—for example, suitable sensors may include complementary metal-oxide-semiconductor (CMOS), high density, short channel metaloxide-semiconductor (HMOS), charge-coupled device (CCD), and other types of sensors.

Suitable composition analyzers may use, for example, radiation emitters such as plasma, electron beam, or any other radiation emitters suitable to heat a material of each fragment in at least one spot on a surface of that fragment to a point where the material will emit a sufficient quantity and quality of characteristic radiation while cooling down so as to permit a sensor to detect that characteristic radiation and to allow for a processor to determine a composition of the material from that characteristic radiation. The composition analyzer can be adapted to withstand continuous use, as well as typical conditions that may be present in a particular waste metal recycling operation. Such conditions may include vibrations resulting from the operation of transfer mechanisms, and dust and other particles produced in the recycling process.

Alternatively, other means of estimating composition not involving measuring characteristic radiation may be used.

Since a single fragment may include multiple contaminant elements, in some examples a contaminant concentration estimate may be determined for several contaminant elements of that fragment. For example, a fragment may contain two contaminant elements, i.e., a first contaminant element and a second contaminant element. Accordingly, at step 316, a first contaminant concentration estimate of the first contaminant element may be made and a second contaminant concentration estimate of the second contaminant element may be made. Further, it is to be understood that not all fragments will contain the same contaminant elements. For example, some fragments in a plurality of fragments may be contaminated by paint, some may be contaminated by rust, and some may be contaminated by paint and rust.

Further, although desirable, it may be impractical to determine a contaminant concentration estimate of each contaminant element for each fragment of the plurality of fragments. For example, it may be impractical to test each fragment of the plurality of fragments due to the amount of time required to make a contaminant concentration estimate. Accordingly, in some examples, a subset of the plurality of fragments may be used as a representative sample of fragments of the plurality of fragments, and contaminant concentration estimates for each contaminant element may be determined for only the fragments of the representative sample of fragments.

At step 318, a data processor is operated to determine an aggregate contaminant concentration calculation for the batch of fragments, based on a representative sample of fragments from the batch of fragments. For example, the aggregate contaminant concentration calculation may be based on the highest contaminant concentration estimates measured in the representative sample of fragments, or the proportion of fragments having contaminant concentration estimates over a specific threshold. This threshold may be specific to a particular contaminant element. For example, the aggregate contaminant concentration calculation may be based on the proportion of fragments having an iron concentration estimate over a specific threshold. Alternatively, many contaminant elements may be assigned their own specific threshold. For example, the aggregate contaminant concentration calculation may be based on the proportion of fragments having an iron concentration estimate over a specific threshold for iron and/or a lead concentration estimate over a specific threshold for lead.

In some embodiments, the aggregate contaminant concentration calculation may include determining, from individual contaminant concentration estimates for individual fragments for a specific contaminant, a standard deviation or variance for concentrations of that contaminant in the representative sample of fragments. If that standard deviation or variance is too high, then the batch may be rejected as the aggregate contaminant concentration estimate for that contaminant may not be determinable with sufficient certainty. Then, the specific thresholds for a specific contaminant may be determined at least partly based on the variance or standard deviation amongst the contaminant concentration estimates for that contaminant in the representative sample of fragments. The higher the standard deviation, the lower the specific threshold for that contaminant should be set, relative to the maximum allowable concentration of that contaminant in the recycled alloy, to reduce the probability that the actual concentration of that contaminant in the recycled alloy will exceed the maximum allowable concentration.

If a sufficient proportion of fragments in the representative sample of fragments have unduly high contaminant concentration estimates, say over the specific thresholds for those contaminant elements, then this may indicate an upstream problem, such as inadequate cleaning of the fragments, or that some waste metal pieces were included in the batch that should not have been. That is, it may be desirable to reject a plurality of fragments if the aggregate contaminant concentration estimate cannot be estimated with a high enough certainty, and the presence of very contaminated fragments can be an indication that the aggregate contaminant concentration estimate cannot be estimated with a high enough certainty.

For example, consider a representative sample of fragments including n fragments, n being a positive integer. For the representative sample of fragments to adequately represent the plurality of fragments, n should be selected to be sufficiently large. Now say that it has been determined from experience (i.e., from empirical data collected from prior recycling process instances), that if a high enough proportion of fragments in the representative sample of fragments have iron concentrations over a threshold percentage, say 5%, then this suggests (increases the probability) that there is some problem with the upstream supply or cleaning of the plurality of fragments. The number of fragments having an unduly high iron concentration, and their unduly high iron concentrations, may or may not be significant enough to raise the expected aggregate iron concentration for the entire plurality of segments above acceptable limits. However, even if the number of fragments having an unduly high iron concentration, and their unduly high iron concentrations, is insufficient to raise the expected aggregate iron concentration within the entire plurality of fragments above the acceptable limit, it may be desirable to reject the plurality of fragments as the number of fragments in the representative sample of fragments having an unduly high iron concentration may reduce the confidence in the accuracy of the aggregate iron concentration estimate that can be determined for the entirety of the plurality of fragments based only on iron concentration estimates for the fragments of the representative sample of fragments.

In other examples, the aggregate contaminant concentration calculation may be based on an average of all the contaminant concentration estimates measured for each fragment of the representative sample of fragments, i.e., be based on an aggregate contaminant concentration estimate. That is, the decision to approve or reject a plurality of fragments may be made by comparing an average of the contaminant concentration estimates measured for each fragment of the representative sample of fragments to a threshold for each contaminant element. Provided the representative sample of fragments is sufficiently large relative to the entire plurality of fragments, the average of all the contaminant concentration estimates measured for each fragment of the representative sample of fragments, is likely to provide a statistically accurate approximation of the aggregate contaminant concentrations for the entire plurality of fragments.

Any statistical method known in the art may be used to determine the minimum size of a smaller sample population required to statistically represent the larger population such that attributes of the larger population can be inferred from the attributes measured for the smaller population. Statistical methods may also be used to provide uncertainty values of aggregate concentration composition calculations.

If the representative sample of fragments only contains one contaminant element, the aggregate contaminant concentration calculation can be based only on the aggregate contaminant concentration estimates for that contaminant element. If the representative sample of fragments contains, for example, three contaminant elements, the aggregate contaminant concentration calculation can be based on the aggregate contaminant concentration estimates for each of the three contaminant elements. That is, the aggregate contaminant concentration calculation for the plurality of fragments can be based on each of the aggregate contaminant concentration estimates of each contaminant of the representative sample of fragments of the plurality of fragments.

For example, consider a representative sample of fragments that includes ten identically sized fragments, three of which have a contaminant concentration estimate of 5% by weight iron and a contaminant concentration estimate of 3% by weight lead, three of which have a contaminant concentration estimate of 3% by weight iron and a contaminant concentration estimate of 1% by weight lead, two of which have a contaminant concentration estimate of 7% by weight copper, and two of which have a contaminant concentration estimate of 1% by weight iron, a contaminant concentration estimate of 3% by weight copper, and a contaminant concentration estimate of 2% by weight silicon.

In this example, the aggregate contaminant concentration calculation may be based on an average of each of the contaminant concentration estimates for each fragment, i.e., the aggregate contaminant concentration estimate which, for this example, is 2.6% by weight iron, 1.2% by weight lead, 2% by weight copper, and 0.4% by weight silicon.

Accordingly, the aggregate contaminant concentration calculation can be based on the aggregate contaminant concentration estimate(s) in different ways: for example, i) by determining, for each contaminant, mean values for the contaminant concentration estimates for individual fragments and/or the variance or standard deviation in these contaminant concentration estimates for individual fragments, or ii) by determining that the aggregate contaminant concentration estimate(s) cannot be estimated with a high enough certainty, because of the presence of very contaminated fragments within the representative sample of fragments (and possibly concerns about possible errors in upstream cleaning or other processing steps).

At step 320, the batch of fragments is approved or rejected based on the aggregate contaminant concentration calculation. In some examples, the aggregate contaminant concentration calculation can be a series of calculations used to approve or reject the plurality of fragments. For example, the aggregate contaminant concentration calculation may comprise the following calculations: (a) can each of the aggregate contaminant concentration estimates be estimated with a high enough certainty?; if yes (b) is each aggregate contaminant concentration estimate below a threshold for that contaminant element?; if yes to (a) and (b), approve the plurality of fragments; if no to either one of (a) or (b), reject the plurality of fragments.

At step 322, approved batches of fragments are provided to a downstream recycling process to produce a target aluminum alloy. Any method known in the art for recycling aluminum alloy waste metal into an aluminum alloy product may be utilized by the downstream recycling process.

At step 324, rejected batches of fragments are not provided to a downstream recycling process to produce a target aluminum alloy. Fragments that are rejected are deemed to not be in suitable condition for the downstream recycling process based on the high levels of contaminant concentration determined at step 318. Rejected fragment batches may be further processed before being provided to a downstream recycling process. Additionally, inferences can be drawn based on the nature of the contamination. For example, instead of the cleaning of the fragments being inadequate, it may be that different batches have been inadvertently mixed, contaminating at least one of the batches. This feedback information can then be used to, in the future, better divide the processing of separate batches, to impede cross-contamination.

Referring now to FIG. 4, pictured therein is an alternate method 400 of processing aluminum alloy rims. Method 400 may comprise any of the steps of method 100, and additionally comprises steps 402 and 412b. Some examples of method 400 may additionally comprise steps 416, 418, 420, 422, and 424. Step 412b corresponds to step 112b. All description above relating to step 112b applies to step 412b of method 400.

At step 402, contaminant composition ranges, comprising a maximum contaminant concentration for each contaminant are stored in non-transient computer-readable memory. As described above in reference to steps 312b and 316, contaminants present in batches of fragments may comprise several contaminants. These contaminants may be present in a batch of fragments at a range of concentrations. A certain concentration of contaminants within a batch of fragments may exist at a level above what can be reasonably be processed by a typical downstream recycling process without undue effort and cost. This may be defined as the maximum contaminant concentration. A contaminant composition range may define a range of contaminant concentrations that may be deemed acceptable for providing to a downstream recycling process. For each contaminant, the upper extreme of the contaminant composition range may correspond to the maximum contaminant concentration. These values are stored in non-transient computer-readable memory.

At step 412, the fragments are cleaned. This cleaning step includes shot blasting to remove at least one contaminant element from the fragments. Step 412, shot blasting to remove at least one contaminant element, may be as described above in reference to steps 312b and 112b of methods 300 and 100 respectively.

Some examples of method 400 may further comprise steps 416, 418, 420, 422 and 424. At step 416, a contaminant concentration estimate is determined for a fragment. A similar method may be used to determine a contaminant concentration as was used at step 316 to determine a contaminant concentration. The description of step 316 above similarly applies to step 416.

At step 418, a data processor is operated to determine an aggregate contaminant concentration calculation based on a representative sample of fragments from the batch of fragments. A similar method may be used to determine an aggregate contaminant concentration calculation as was used at step 318 to determine an aggregate contamination concentration calculation. The description of step 318 above similarly applies to step 418.

At step 420, the batch of fragments is approved or rejected based on the aggregate contaminant concentration calculation. In some examples, the batch may be approved or rejected by operating a data processor. In some examples, the aggregate contaminant concentration calculation can be a series of calculations used to approve or reject the plurality of fragments. For example, the aggregate contaminant concentration calculation may comprise the following calculations: (a) can each of the aggregate contaminant concentration estimates be estimated with a high enough certainty?; if yes (b) is each aggregate contaminant concentration estimate below a threshold for that contaminant element?; if yes to (a) and (b), approve the plurality of fragments; if no to either one of (a) or (b), reject the plurality of fragments. In other embodiments, these two steps may be combined. That is, if the aggregate contaminant concentration estimate is well below the threshold for that contaminant element, then even if the variance of this estimate is relatively high, increasing uncertainty, the plurality of fragments can still be approved as it is sufficiently unlikely that the actual contaminant concentration is above the acceptable composition range.

At step 422, approved batches of fragments are provided to a downstream recycling process to produce a target aluminum alloy. Any method known in the art for recycling aluminum alloy waste metal into an aluminum alloy product may be utilized by the downstream recycling process.

At step 424, rejected batches of fragments are not provided to a downstream recycling process without further cleaning to remove any contaminant. Rejected batches of fragments are not provided to a downstream recycling process to produce a target aluminum alloy. Fragments that are rejected are deemed to not be in suitable condition for the downstream recycling process based on the high levels of contaminant concentration determined at step 318. Rejected fragment batches must be further processed before being provided to a downstream recycling process.

Referring now to FIG. 5, pictured therein is an alternative method 500 of processing aluminum alloy rims. Method 500 may include any of the steps of method 100, and further comprises steps 526, 528, 530, 532, and 534.

At step 526, an estimated composition for each element, of each fragment of a representative sample of fragments in a batch of fragments is determined. While each batch of fragments is associated with an aluminum alloy rim category, the exact composition of a rim of the aluminum alloy rim category may not be known. The category may correspond to a certain style of rim, but the exact composition of the rim may be unknown. Alternatively, the category may correspond to rims made of a certain aluminum alloy. However, within a specific alloy, exact compositions may vary. For example, Eccomelt 356.2 aluminum alloy has specified composition ranges of: Si: 6.5%-7.5%, Cu: 0%-0.02%, Fe: 0%-0.014%, Mg: 0.25%-0.4%, Zn: 0%-0.018%, Mn: 0%-0.03%, Ni: 0%-0.008%, Cr: 0%-0.03%, Sn: 0%-0.01% Ti: 0%-0.15% Sr: 0%-0.02% Al: 0%-91.674%. When recycling aluminum alloy rims, it is advantageous to determine a good estimate of the composition of the recycling source material, as slight variations in composition may result in large variations in physical and chemical properties, and by extension industrial and market value. Similarly, the rims from which the batch of fragments originate may have been subjected to environmental conditions that resulted in increased corrosion, and therefore, composition changes. Similarly, every rim may have corroded to different extents, resulting in rims with varying compositions.

Any method known in the art for estimating the composition of a metal sample may be used at step 526 to determine an estimated composition of each element of each fragment of a representative sample of fragments. In some examples, a single composition measurement may be made of each fragment of the representative sample of fragments. The location of this measurement may affect the composition estimate. For example, if a measurement is made directly on a rust spot, the composition estimate may be different than if the measurement, on the same fragment, was made adjacent to the rust spot. Accordingly, in some examples, multiple composition measurements may be made of each fragment of the representative sample of fragments. That said, the composition measurements are to be understood as estimates. It is to be understood that if enough measurements are made on enough fragments, based on statistical analysis, an accurate estimate of the composition can be made.

In one example, a "Laser-Induced Breakdown Spectroscopy" ("LIBS") composition analyzer manufactured by Laser Distance Spectrometry can be adapted as the laser scanner and sensor. The LIBS composition analyzer may include a radiation emitter, such as an Nd:YAG laser. The laser may shine at a frequency ranging from 1 to 20 hertz, thereby raising the temperature of the fragments at the point of contact between the fragment and the laser to above 30,000 degrees Celsius and generating plasma. The plasma may quickly cool down, returning the energized ions to a low energy state. While returning to the low energy state, the ions may emit characteristic radiation. The LIBS composition analyzer may contain one or more sensors that detect the characteristic radiation. A processor may then analyze readings obtained from the sensors and determine from them the concentration of the constituents contained in the material undergoing the temperature change. The processor may be disposed within the composition analyzer. Alternatively, the processor may be a remote processor.

Other suitable composition analyzers may include composition analyzers that use laser spectroscopy or other systems that rely on other methods of inducing characteristic radiation to be emitted by a material of each fragment at a surface of that fragment and detecting and analyzing that characteristic radiation to determine a composition of that material. The composition analyzers may detect the characteristic radiation by using any suitable sensor—for example, suitable sensors may include complementary metal-oxide-semiconductor (CMOS), high density, short channel metal-oxide-semiconductor (HMOS), charge-coupled device (CCD), and other types of sensors.

Suitable composition analyzers may use, for example, radiation emitters such as plasma, electron beam, or any other radiation emitters suitable to heat a material of each fragment in at least one spot on a surface of that fragment to a point where the material will emit a sufficient quantity and quality of characteristic radiation while cooling down so as to permit a sensor to detect that characteristic radiation and to allow for a processor to determine a composition of the material from that characteristic radiation. The composition analyzer can be adapted to withstand continuous use, as well as typical conditions that may be present in a particular waste metal recycling operation. Such conditions may include vibrations resulting from the operation of transfer mechanisms, and dust and other particles produced in the recycling process.

Alternatively, other means of detecting composition not involving measuring characteristic radiation may be used.

At step 528, an aggregate composition estimate for the batch of fragments is determined. For example, the aggregate composition estimate may be based on the composition estimates measured in the representative sample of fragments at step 526.

In some embodiments, the aggregate composition calculation may include determining, from composition estimates for individual fragments, a standard deviation or variance for concentrations of that composition in the representative sample of fragments. If that standard deviation or variance is too high, then the batch may be rejected as the aggregate concentration estimate may not be determinable with sufficient certainty.

Consider a representative sample of fragments including n fragments, n being a positive integer. For the representative sample of fragments to adequately represent the plurality of fragments, n should be selected to be sufficiently large. Now say that it has been determined from experience (i.e., from empirical data collected from prior recycling process instances), that if a high enough proportion of fragments in the representative sample of fragments have iron concentrations over a threshold percentage, say 5%, then this suggests (increases the probability) that there is some problem with the upstream supply or cleaning of the plurality of fragments. The number of fragments having an unduly high iron concentration, and their unduly high iron concentrations, may or may not be significant enough to raise the expected aggregate iron concentration for the entire plurality of segments above acceptable limits. However, even if the number of fragments having an unduly high iron concentration, and their unduly high iron concentrations, is insufficient to raise the expected aggregate iron concentration within the entire plurality of fragments above an acceptable limit, it may be desirable to reject the plurality of fragments as the number of fragments in the representative sample of fragments having an unduly high iron concentration may reduce the confidence in the accuracy of the aggregate iron concentration estimate that can be determined for the entirety of the plurality of fragments based only on iron concentration estimates for the fragments of the representative sample of fragments.

In other examples, the aggregate composition estimate may be based on an average of all the composition estimates measured for each fragment of the representative sample of fragments. Provided the representative sample of fragments is sufficiently large relative to the entire plurality of fragments, the average of all the composition estimates measured for each fragment of the representative sample of fragments, is likely to provide a statistically accurate approximation of the aggregate composition for the entire plurality of fragments.

Any statistical method known in the art may be used to determine the minimum size of a smaller sample population required to statistically represent the larger population such that attributes of the larger population can be inferred from the attributes measured for the smaller population. Statistical methods may also be used to provide uncertainty values of aggregate concentration composition calculations.

In other examples, any other statistical method known in the art may be used to determine an aggregate composition estimate for the batch of fragments based on a representative sample of fragments of a batch of fragments.

At step 530, a data processor is operated to approve a batch of fragments when the aggregate composition estimate for each element falls within the associated aluminum alloy composition range determined for the category of the batch at step 106, and rejecting those that do not. The data processor compares the composition estimate for each element, determined at step 528, with the accepted composition range for the aluminum alloy rim category, as stored at step 106. If the concentration value estimate for each element falls within the accepted composition range for the aluminum alloy rim category, the batch is approved. If the concentration of a single element falls outside the accepted composition range for the aluminum alloy rim category, the batch is rejected.

At step 532, the approved batch of fragments are provided to a downstream recycling process to produce a target aluminum alloy. Any method known in the art for recycling aluminum alloy waste metal into an aluminum alloy product may be utilized by the downstream recycling process.

At step 534, the rejected batches of fragments are not provided to a downstream recycling to produce a target aluminum alloy. Fragments that are rejected are deemed to not be in suitable condition for the downstream recycling process based on the improper composition estimate determined at step 528. Rejected fragment batches may be further processed before being provided to a downstream recycling process.

Figure 6:
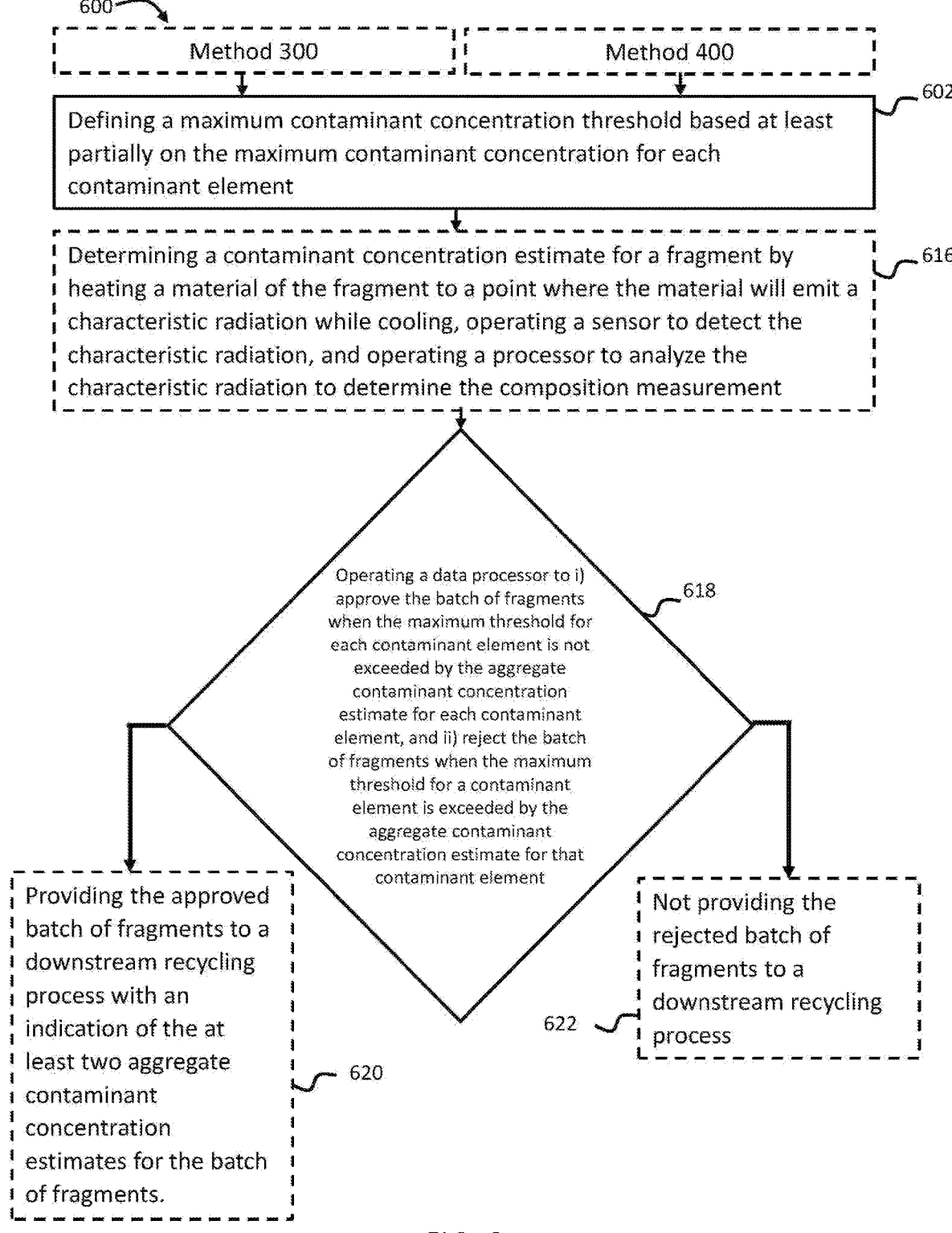
FIG. 6, in a flow chart, illustrates a method of processing aluminum alloy rims.

Referring now to FIG. 6, pictured therein is a flowchart of an alternate method 600 of processing aluminum alloy rims. Some examples of Method 600 may include any of the steps of method 300, and further comprise steps 602, 618, and 620, and in some examples, steps 616 and 622. Other examples of Method 600 may include any of the steps of method 400, and further comprise steps 602, and 618, and in some examples, steps 616, 620 and 622.

At step 602, a maximum contaminant threshold is determined, based at least partially on the maximum contaminant concentration for each contaminant element. In some examples, contaminant elements may include any or all of the following elements: Fe, Ni, Cr, Si, Pb, Cu, and Zn. The maximum contaminant threshold is based at least partially on the maximum contaminant concentration, for example, as determined at step 402. In some examples, the maximum threshold may be equivalent to exceeding the maximum contaminant concentration for any contaminant element. For example, at step 402, it may be determined that the maximum contaminant concentration may be as follows: Fe: 1.2%, Ni: 0.5%, Pb: 0.1%. At step 602, the maximum contaminant threshold is set such that if the estimated concentration of any one of the three elements exceeds the maximum contaminant concentration, the maximum contaminant concentration threshold will be exceeded. For example, in a sample, if the estimated contaminant concentrations are as follows: Fe: 0.1%, Ni: 0.1%, Pb: 0.2%, the maximum contaminant concentration threshold has been exceeded. In other examples, the maximum contaminant concentration threshold may be set such that only one specific element is of issue, and if the maximum contaminant concentration is exceeded for that element, the maximum contaminant concentration threshold will be exceeded (this embodiment may be useful for example, where the manufacturer is only concerned about one contaminant, or some subset of possible contaminants, exceeding the applicable maximum concentrations). In other examples, the threshold may be set such that if a certain percentage of the maximum contaminant concentration is exceeded for every contaminant element, the maximum contaminant concentration threshold is exceeded. For example, if at least 70% of the maximum contaminant concentration is exceeded for every contaminant element, the maximum contaminant concentration threshold will be exceeded. In other examples, other methods of determining a maximum contaminant concentration threshold may be used, using any mathematical or statistical method known in the art. For example, the percentage threshold of 70% may be increased where a standard deviation or variance determined with respect to an aggregate contaminant concentration estimate is relatively low, as this decreases the probability that the actual contaminant concentration will be significantly higher than the aggregate contaminant concentration estimate. On the other hand, the percentage threshold of 70% may be decreased where a standard deviation or variance determined with respect to an aggregate contaminant concentration estimate is relatively high, as this increases the probability that the actual contaminant concentration will be significantly higher than the aggregate contaminant concentration estimate.

At step 618, a data processor is operated to approve a batch of fragments when the maximum threshold for each contaminant element is not exceeded by the aggregate contaminant concentration estimate for each contaminant, or reject a batch of fragments when the maximum threshold of at least one contaminant element of the plurality of contaminant elements is exceeded by the aggregate contaminant concentration estimate for that contaminant In other examples, different measures may be used to approve batches of fragments.

Batches may be rejected when the aggregate contaminant concentration threshold for any single element in the plurality of elements is exceeded by the associated aggregate contaminant concentration estimate. In other embodiments (when, for example, the intended recipient of the batch is only concerned about some contaminants), batches may be rejected when the aggregate contaminant concentration threshold for some subset of elements in the plurality of contaminant elements is exceeded by their associated aggregate contaminant concentration estimates.

Some examples of method 600 may further comprise step 616. At step 616, a contaminant concentration estimate for a fragment is determined by heating a material of the fragment to a point where the material will emit a characteristic radiation while cooling, operating a sensor to detect the characteristic radiation, and operating a processor to analyze the characteristic radiation to determine the composition measurement. In one example, a "Laser-Induced Breakdown Spectroscopy" ("LIBS") composition analyzer manufactured by Laser Distance Spectrometry may be used to carry out step 616. The LIBS composition analyzer may include a radiation emitter, such as an Nd:YAG laser. The laser may shine at a frequency ranging from 1 to 20 hertz, thereby raising the temperature of the fragments at the point of contact between the fragment and the laser to above 30,000 degrees Celsius and generating plasma. The plasma may quickly cool down, returning the energized ions to a low energy state. While returning to the low energy state, the ions may emit characteristic radiation. The LIBS composition analyzer may contain one or more sensors that detect the characteristic radiation. A processor may then analyze readings obtained from the sensors and determine from them the concentration of the constituents contained in the material undergoing the temperature change. The processor may be disposed within the composition analyzer. Alternatively, the processor may be a remote processor.

Other suitable composition analyzers may include composition analyzers that use laser spectroscopy or other systems that rely on other methods of inducing characteristic radiation to be emitted by a material of each fragment at a surface of that fragment and detecting and analyzing that characteristic radiation to determine a composition of that material. The composition analyzers may detect the characteristic radiation by using any suitable sensor—for example, suitable sensors may include complementary metal-oxide-semiconductor (CMOS), high density, short channel metal-oxide-semiconductor (HMOS), charge-coupled device (CCD), and other types of sensors.

Suitable composition analyzers may use, for example, radiation emitters such as plasma, electron beam, or any other radiation emitters suitable to heat a material of each fragment in at least one spot on a surface of that fragment to a point where the material will emit a sufficient quantity and quality of characteristic radiation while cooling down so as to permit a sensor to detect that characteristic radiation and to allow for a processor to determine a composition of the material from that characteristic radiation. The composition analyzer can be adapted to withstand continuous use, as well as typical conditions that may be present in a particular waste metal processing operation. Such conditions may include vibrations resulting from the operation of transfer mechanisms, and dust and other particles produced in the recycling process.

Some examples of method 600 may further comprise steps 620 and 622. At step 620, approved batches of fragments are provided to a downstream recycling process, with an indication of aggregate contaminant concentration estimates for the batch of fragments. In some examples, an aggregate contaminant concentration estimate for at least two or some subset contaminant elements is provided.

A downstream recycling process may be any process known in the art suitable for recycling waste metal, and more specifically, waste aluminum alloy pieces. The indications of contaminant concentration estimates for each batch may be used to determine the suitability of the batch for recycling into certain alloys. For example, the presence of certain contaminant elements at high levels, such as lead, may render the batch unsuitable for recycling into a certain alloy wherein high lead levels are not permitted. Batches accompanied by indications of low contaminant levels may be provided to process to produce high value alloys. Similarly, certain downstream recycling processes may be better equipped to process batches of aluminum alloy fragments with high levels of contaminants. These processes may be otherwise undesirable for reasons such as output product quality, or cost. Providing the batch with the indication of aggregate contaminant concentration estimates for the batch of fragments enables one to choose a more optimal use for the batch of aluminum alloy fragments.

Contaminant concentration indications may be in the form of a physical, printed or written indicia associated with the batch, an electronic value stored in non-transient computer-readable memory, or any other form known in the art for associating data with a physical product.

At step 622, rejected batches of fragments are not provided to a downstream recycling process.

Referring now to FIG. 7, pictured therein is a flowchart of an alternative method 700 of processing aluminum alloy rims. Method 700 may include any of the steps of method 100, and further comprises steps 712*b*, 714 and in some examples, 736 and 738.

At step 712*b*, aluminum alloy rims are processed by cleaning the aluminum alloy rims while keeping them intact. Aluminum alloy rims may be cleaned by any method known in the art for cleaning aluminum alloy objects. Aluminum alloy rims may be cleaned by shot blasting. Description in relation to step 112*b* above, wherein aluminum alloy fragments are cleaned by shot blasting, may be applied to step 712*b* for the cleaning of intact aluminum alloy rims. Other mechanical processes may be used to clean intact aluminum alloy rims. These may include brushing, wiping, scraping or other processes that may mechanically remove debris from the surface of a metal object. In other examples, liquid solvents may be used to remove debris from the intact aluminum alloy rims. Liquid solvents may include water, alcohol, mineral spirits, degreasing solutions, or any other solvent known in the art for cleaning aluminum alloy products. In other examples, any other method known in the art for cleaning aluminum alloy rims may be used.

At step 714, for each batch of aluminum alloy rims, cleaned aluminum alloy rims of each batch are separately supplied for processing. Each batch may be physically separated from other batches and subjected to separate processing. In some examples, each batch of cleaned, intact aluminum alloy rims may be provided to a refurbishing process. In other examples, each batch of cleaned, intact aluminum alloy rims may be provided to a recycling process. In some examples, intact aluminum alloy rim batches may each be provided to different processes.

Some examples of method 700 may further include step 736. At step 736, manufacturer records identifying a plurality of aluminum alloy rim manufacturers, are stored in non-transient computer-readable memory. These records may include, for each category, an associated aluminum alloy rim manufacturer for that category. Each category stored in memory at step 104 is associated with a manufacturer of that category. For example, a category may comprise rim type A1. The manufacturer of type A1 rims, ABC, may be associated with the category.

In methods including step 736, supplying aluminum alloy rims batches for processing at step 714 comprises supplying each batch of cleaned, intact aluminum alloy rims to the associated aluminum alloy rim manufacturer for that batch. For example, A cleaned, intact batch of type A1 aluminum alloy rims as referred to above may be supplied to manufacturer ABC for processing. In other examples, the associated manufacturer stored at step 736 may not necessarily be the original manufacturer of the aluminum alloy rim. For example, a batch of rim type A1, originally manufactured by ABC, may be associated with manufacturer DEF, and supplied to manufacturer DEF at step 714 for processing.

Some examples of method 700 may further comprise step 738, Storing in the non-transient computer-readable memory at least two different product designations for a particular manufacturer, designating at least two different categories of aluminum alloy rims. Description above in reference to step 204 may apply to step 738.

In some examples, product designations may include rims of a specific alloy, style, size, surface treatment, age or other characteristics. Product designations stored at step 738 correspond to an aluminum alloy rim category stored in memory at step 104 described above. The at least two different product designations stored at step 738 correspond to two different aluminum alloy rim categories. In some examples, more than two product designations may be stored. It is possible that within this set of more than two product designations stored, two product designations may correspond to the same aluminum alloy rim category. For example, product designation A1, product designation A2, and product designation B1, all produced by manufacturer ABC may correspond to only two aluminum alloy rim categories as stored at step 104. A1 and A2 may correspond to example category 1, while B1 may correspond to example category 2.

In some examples of method 700, a data processor is operated to determine the aluminum alloy rim category for that aluminum alloy rim based on its serial number. Aluminum alloy rims of at least a first kind and a second kind are provided. Each kind of aluminum alloy rim may be associated with a certain product designation as stored in memory at step 738. The serial number of a first kind of rim is determined as described at step 110*a*. The serial number of a second kind of rim is determined as described at step 110*a*. A data processor is then operated, as described for step 110*b* to determine the aluminum alloy rim category associated with each kind of rim. The first kind of rim is associated with a first aluminum alloy rim category. The second kind of rim is associated with a second alloy rim category. For example, rim type A1 from manufacturer ABC and rim type B1 from manufacturer ABC may be provided. The serial number of each rim is scanned, then a data processor is operated to determine the associated aluminum alloy rim category for each kind of aluminum alloy rim, as described above in reference to method 100. For example, rim type A1 may be associated with category 1, while rim type B1 may be associated with category 2. All rims of each kind, each comprising the same product designation, are associated with the same category. For example, all type A1 rims provided to method 700 may be associated with category 1, and all type B1 rims provided to method 700 may be associated with category 2.

Aluminum alloy rims are allocated to a first or second batch of aluminum alloy rims. Each batch corresponds to an aluminum alloy rim category as described at step 110*c*. Additionally, each batch corresponds to a product designation as stored at step 738. Rims of each kind are allocated to separate batches. For example, all rims of type A1, all associated with category 1, are allocated to batch 1, and all rims of type B1, all associated with category 2, are allocated to batch 2. As described at step 110*c*, rims may be allocated to each batch by physically separating rims. In some examples, a human operator may separate rims into separate batches. In other examples, automated equipment, such as a conveyer system, or robotic arm, may automatically allocate rims into batches based on previously determined attributes.

In some examples of method 700, aluminum alloy rims may be allocated to more than two batches. For example, the aluminum alloy rims may be divided into 10 or 20 batches, each batch comprising intact rims.

Each batch of aluminum alloy rims can be supplied to the particular manufacturer associated with the category of each batch, as stored in memory at step 108. The first batch is provided to the manufacturer, along with an indication that the first batch corresponds to a first category of aluminum alloy rims. Separately, the second batch is provided to the manufacturer, along with an indication that the second batch corresponds to the second category. For example, rims of batch 1, are supplied to manufacturer ABC, along with an indication that rims of batch 1 correspond to aluminum alloy rim category 1, and rims of batch 2 are supplied to manufacturer ABC, along with an indication that rims of batch 2 correspond to category 2. In some examples, indications of rim category may be a physical indicator, such as a printed adhesive label attached to each rim in the batch, a painted indication or other physical indicators. In other examples, the indication provided with each may be an electronic record, such as a stored value in non-transient computer-readable memory, or other electronic means of indication.

Figure 8:
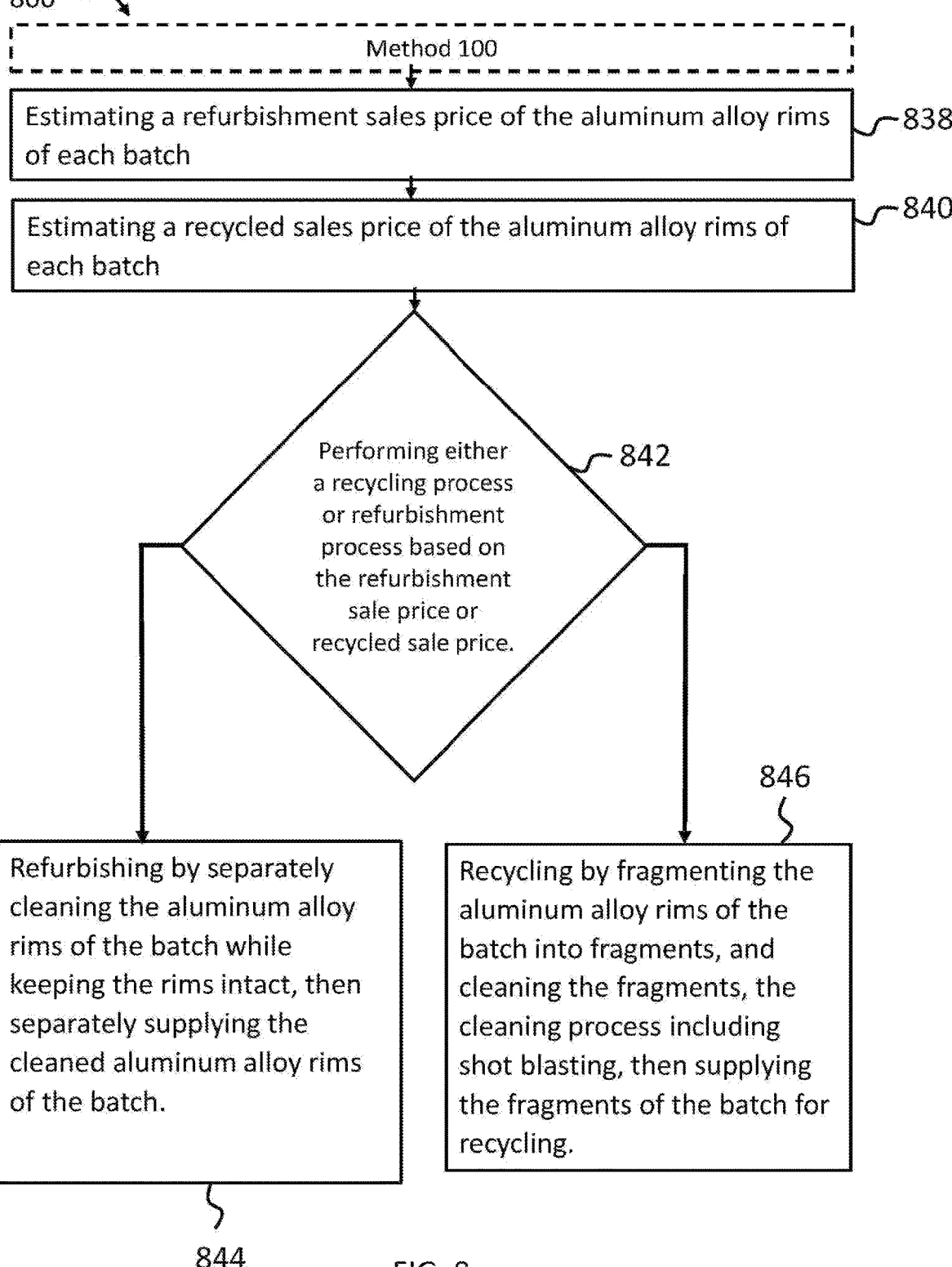
FIG. 8, in a flow chart, illustrates a method of processing aluminum alloy rims.

Referring now to FIG. 8, pictured therein is a flowchart of an alternative method 800 of processing aluminum alloy rims. Method 800 may include any of the steps of method 100, and further comprises steps 838, 840, 842, 844 and 846.

At step 838, aluminum alloy rims are provided, previously separated into batches at step 110. A refurbishment sales price of the aluminum alloy rims of each batch is estimated. A refurbishment sales price of the aluminum alloy rims could be the market price market for the batch aluminum alloy rims, if the rims are in good working condition. A refurbishment sales price may be determined by a number of methods. The associated aluminum alloy rim category for each aluminum alloy rim may be used to identify analogous products available on the market. For example, if the aluminum alloy rim category associated with the batch is rim type A1 from manufacturer ABC, the market may be surveyed to determine the used market value of A1 type rims from manufacturer ABC. This used market value may be determined to be the refurbishment sales price. Alternatively, in some examples, a third-party aluminum rim bulk purchaser may be consulted to determine a used market value for rims of type A1 from manufacturer ABC. A bulk rim purchaser may quote a price lower than the price of A1 type rims on the used market; however, this price may be closer to the correct refurbishment sales price, as it may not be efficient to sell individual rims on the used market.

In other examples, if the aluminum alloy rim category associated with the batch is 17-inch diameter aluminum alloy rims, the market may be surveyed to determine the average used market value of 17-inch diameter aluminum alloy rims. Alternatively, in some examples, a third-party aluminum rim bulk purchaser may be consulted to determine a used market value for 17-inch diameter aluminum alloy rims.

In other examples, if the aluminum alloy rim category associated with the batch is A356 aluminum alloy rims, the market may be surveyed to determine the average used market value of A356 aluminum alloy rims. Alternatively, in some examples, a third-party aluminum rim bulk purchaser may be consulted to determine a used market value for A356 aluminum alloy rims.

Once determined, the estimated refurbishment sales price may be stored for later reference. The estimated refurbishment sales price may be corrected to account for costs of wholesaling, storage, refurbishment processes such as cleaning and minor repairs, or any other operational costs that may be borne during the process of refurbishment and sale.

At step 840, an aluminum alloy rim recycled sales prices of each batch of rims is estimated. A recycled sales price of the aluminum alloy rims is the price that may be reasonably commanded on the market for the raw material comprising the batch of aluminum alloy rims, less processing and handling costs. In some examples, the associated aluminum alloy rim category for the batch of rims may be used to determine a recycled sales price. For example, if the associated aluminum alloy rim category is A356 aluminum alloy rims, the wholesale per weight unit price of scrap A356 aluminum may be used to determine a recycled sales price. The batch of rims may be weighed and counted to determine the total weight of rims, and weight of the batch of rims. The total weight of the batch of rims may be divided by the number of rims in the batch, resulting in an average weight per rim in the batch. The previously determined A356 per weight unit price may be multiplied by the average weight per rim, to determine a gross recycled sales price per rim in the batch of aluminum alloy rims. The gross recycled sales price may be further adjusted to account for processing and handling costs. These costs may include the costs of fragmenting rims, the costs of storing rims, the cost of cleaning rims, including shot blasting, wholesaling costs, and other costs. The gross recycled sale price per rim less the total processing and handling costs may be the estimated recycled sales price per rim.

In some examples, the average weight per rim may be further adjusted to account for expected material loss during processing steps. For example, when shot blasting rims or fragments of rims, small amounts of rim material may be removed, resulting in a reduced weight. Weight adjustments may account for this loss in the final estimated recycled sales price.

In some examples of step 840, the associated aluminum alloy rim category may not correspond to a material. The material properties of the rim may be unknown. A composition analyzer may be utilized, as described at above in reference to step 526 and 528, to determine an aggregate composition estimate for the batch of aluminum alloy rims. This composition estimate may be used to determine a wholesale per unit weight price of scrap metal of a similar composition. In some examples, the rims may be recycled in a manner such that the composition of the batch of rims is adjusted to the composition of a known higher value alloy, by supplementing the batch with alloying elements. In such examples, the wholesale per unit weight price of scrap metal of the high value alloy may be used, and the costs of supplementing the alloy may be subtracted from the recycled sales price.

At step 842, either a recycling process, or refurbishment process is performed based on the refurbishment sale price determined at step 838 and the recycled sale price determined at step 840. At both step 838 and step 840, prices may be normalized to a price per rim, or some other measure to allow for analogous comparison. If the refurbishment sales price is greater than the recycled sales price, step 844 is performed. If the recycled sales price is greater than the refurbishment sales price, step 846 is performed.

At step 844, rims are refurbished by cleaning the aluminum alloy rims while keeping the rims intact, then separately supplying the cleaned aluminum alloy rims of the batch for sale. Rims may be cleaned while keeping them intact as described above in reference to step 712*b*. Rims may be supplied intact, as described above in reference to step 714.

At step 846, the aluminum alloy rims of the batch are recycled by fragmenting them into fragments, and cleaning the fragments, the cleaning process including shot blasting, then supplying the fragments of the batch for recycling. This process may be conducted as described above in reference to steps 112, 112*a*, 112*b*, and 114.

Figure 9:
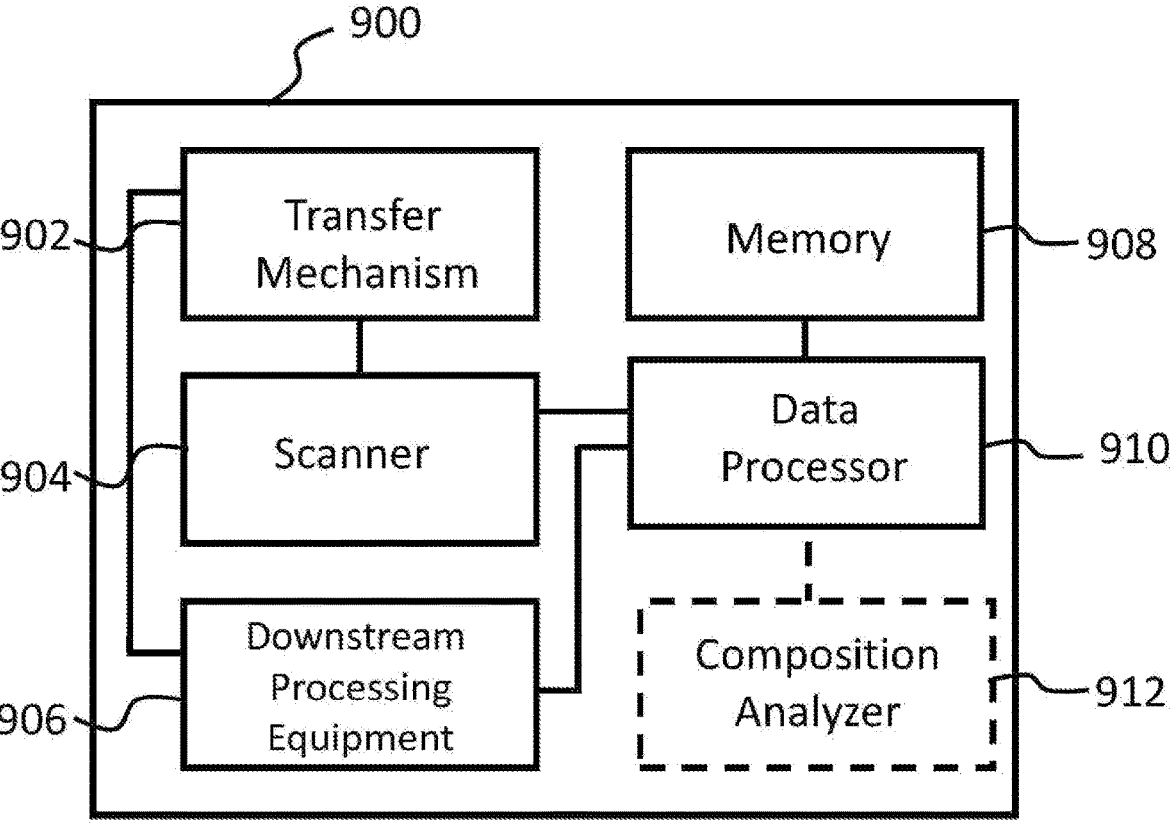
FIG. 9, in a block diagram, illustrates a system for processing aluminum alloy rims.

Referring now to FIG. 9, pictured therein is a block diagram of a system 900 for processing aluminum alloy rims. Description above in reference to methods 100, 200, 300, 400, 500, 600, 700 and 800 may apply to system 900. As shown in FIG. 9, the system 900 for processing aluminum alloy rims may include a transfer mechanism 902, a scanner 904, downstream processing equipment 906, memory 908, and a data processor 910. Some examples of system 900 may further comprise a composition analyzer 912.

In some examples of system 900, the transfer mechanism 902 is provided with a feed of aluminum alloy rims. The transfer mechanism 902 may comprise a conveyer, a pick-and-place unit, a robotic arm, or any other method known in the art for transferring physical objects. The aluminum alloy rims may be loaded onto the transfer mechanism 902 by any means, for example, a truck may dump aluminum alloy rims into a hopper connected to one end of the conveyer 902 or aluminum alloy rims may be placed on the conveyer manually by workers. As described above in reference to FIG. 1-8, each aluminum alloy rim has a serial number.

In some examples of system 900, a plurality of aluminum alloy rim categories may be stored in memory 908. In some examples, memory 908 may be non-transient computer-readable memory.

In some examples, a plurality of aluminum alloy rim composition ranges may be stored in memory 908. Each aluminum alloy rim composition range may be associated with a stored aluminum alloy rim category. Each composition range may comprise, for each element in a plurality of elements, an element range for that element. In some examples, each aluminum alloy composition range may specify at least one maximum contaminant concentration for each contaminant of at least one contaminant.

In some examples, manufacturer records may be stored in memory 908. The manufacturer records may comprise information regarding a plurality of aluminum alloy rim manufacturer, the plurality of aluminum alloy rim manufacturers including for each aluminum alloy rim category, an associated aluminum alloy rim manufacturer.

In some examples, at least two different product designations of aluminum alloy rims for a particular manufacturer may be stored in memory 908. These product designations may designate at least two different categories of aluminum alloy rims.

Transfer mechanism 902 may provide the feed of aluminum alloy rims to the scanner 904. The scanner 904 can then scan the serial number of each aluminum alloy rim in the feed provided by transfer mechanism 902. As described above in reference to step 110*a*, the scanner may be of any type that may scan a serial number printed on, or inscribed into, the aluminum alloy surface of an aluminum alloy rim. In some examples, once scanned, the serial number of each aluminum alloy rim may be stored in memory 908.

Some examples of system 900 may further comprise composition analyzer 912. Composition analyzer 912 may comprise any system known in the art for determining the composition of metallic samples. In some examples, the composition analyzer 912 may comprise a radiation emitter for heating a material of each rim in at least one spot on a surface of that rim to a point where the material will emit a characteristic radiation while cooling down, a sensor for detecting and measuring that characteristic radiation, and a processor for determining from that characteristic radiation a composition of the material. In some examples, composition analyzer 912 is a laser-induced breakdown spectroscopy composition analyzer. Description above in reference to step 526 may apply to the composition analyzer of system 900. In some examples, composition analyzer 912 may be linked to data processor 910 for electronic communication.

Scanner 904 transmits each scanned serial number to data processor 910. Data processor 910 determines from amongst the categories of aluminum alloy rims stored in memory 908, an aluminum alloy rim category to associate with each aluminum alloy rim, based on its scanned serial number. Description above in reference to step 110*b* may apply to this aspect of system 900.

In some examples of system 900, rims of at least two kinds and or product designations are provided. Data processor 910 determines from amongst the categories of aluminum alloy rims stored in memory 908, an aluminum alloy rim category to associate with each kind and or product designation of aluminum alloy rim.

Once each aluminum alloy rim is associated with an aluminum alloy rim category, aluminum alloy rims associated with like categories are separated into batches. In examples of system 900 wherein rims of at least two kinds and or product designations are provided, and then associated with categories, rims of each kind or product designation are separated into batches according to kind or product designation. Each batch corresponds to a category of aluminum alloy rims. Each rim may be allocated into its respective batch by transfer mechanism 902.

In some examples, system 900 may comprise a plurality of paths of travel for the feed of aluminum alloy rims downstream from scanner 904. Each batch of aluminum alloy rims, as identified by data processor 910, may be transported along a selected path, based on the batch of the aluminum alloy rims. For example, example batch 1 may be transported along path A. Example batch 2 may be transported along path B. Example batch 3 may be transported along path A.

Each batch of aluminum alloy rims is separately provided to downstream processing equipment 906. Each batch of aluminum alloy rims is separately processed by downstream processing equipment. In examples of system 900 comprising multiple paths downstream of scanner 904, each batch may be provided to different downstream processing equipment 906.

In some examples, downstream processing equipment 906 may fragment the aluminum alloy rims of each batch into fragments, then shot blast the fragments. In such examples, the downstream processing equipment may comprise a fragmenting unit, such as a commercial shredder, and a shot blasting apparatus. In some examples, fragmenting and cleaning may be conducted as described above in reference to steps 112*a* and 112*b*. In some examples, shot blasting may remove at least one contaminant element from the fragmented aluminum alloy rims.

In some examples of system 900, composition analyzer 912 may be operated to determine a contaminant concentration estimate for each batch of aluminum alloy rims and or fragments, based on a representative sample. In cooperation with data processor 910, an aggregate contaminant concentration estimate may be determined Description above in reference to steps 316 and 318 may apply to this aspect of the system 900.

In examples of system 900 comprising composition analyzer 912, data processor 910 may approve or reject each batch of fragments based on the aggregate contaminant concentration of each contaminant element. Description above in reference to step 320 may apply to this aspect of the system 900.

In some examples, data processor 910 may approve or reject each batch of fragments based on the aggregate contaminant concentration of each contaminant element and the maximum contaminant concentration stored in memory 908. Description above in reference to steps 618 and 620 may apply to this aspect of the system 900.

The present invention has been described here by way of example only. Various modification and variations may be made to these exemplary embodiments without departing from the spirit and scope of the invention, which is limited only by the appended claims.

I claim:

1. A method of processing aluminum alloy rims, the method comprising:

providing a feed of a plurality of aluminum alloy rims of different compositions, each aluminum alloy rim in the plurality of aluminum alloy rims having a serial number distinguishing that aluminum alloy rim from other aluminum alloy rims in the plurality of aluminum alloy rims;

storing in a non-transient computer-readable memory, a plurality of aluminum alloy rim categories;

dividing the feed of aluminum alloy rims into a plurality of batches of aluminum alloy rims by, for each rim in the feed of aluminum alloy rims, scanning that aluminum alloy rim to determine the serial number of that aluminum alloy rim;

based on the serial number, operating a data processor to determine, from amongst the plurality of aluminum alloy rim categories, an aluminum alloy rim category for that aluminum alloy rim, wherein each batch of aluminum alloy rims in the plurality of batches of aluminum alloy rims corresponds to a category in the plurality of aluminum alloy rim categories; and then, allocating that aluminum alloy rim to the batch of aluminum alloy rims corresponding to that aluminum alloy rim category;

after dividing the feed of aluminum alloy rims into the plurality of batches of aluminum alloy rims, separately processing each batch of the plurality of batches of aluminum alloy rims wherein for each batch of aluminum alloy rims of the plurality of batches of aluminum alloy rims, separately processing that batch comprises fragmenting the aluminum alloy rims of that batch into fragments, and then cleaning the fragments, the cleaning including shot blasting the fragments; and then, the method further comprises, for each batch of the plurality of batches of aluminum alloy rims, separately supplying the fragments of that batch for recycling, further comprising storing in the non-transient computer-readable memory, manufacturer records identifying a plurality of aluminum alloy rim manufacturers, the plurality of aluminum alloy rim manufacturers including, for each category in the plurality of categories of aluminum alloy rims, an associated aluminum alloy rim manufacturer for that category, wherein for each batch of the plurality of batches of aluminum alloy rims, separately supplying the fragments of that batch for recycling to produce an aluminum alloy product, comprises supplying the fragments of that batch to the associated aluminum alloy rim manufacturer for the category corresponding to that batch, further comprising storing in the non-transient computer-readable memory, a plurality of aluminum alloy composition ranges, the plurality of aluminum alloy composition ranges comprising, for each category in the plurality of categories of aluminum alloy rims, an associated aluminum alloy composition range for that category, the associated aluminum alloy composition range for that category comprising, for each element in a plurality of elements, an element range for that element;

wherein, for each batch of the plurality of batches of aluminum alloy rims, after shot blasting that batch of fragments, the method further comprises determining a plurality of estimated compositions by, for each fragment of a representative sample of fragments of that batch of fragments determining an estimated composition for that fragment comprising for each element in the plurality of elements, a concentration estimate for that element in that fragment;

determining from the plurality of estimated compositions, an aggregate composition estimate for the plurality of shot blasted pieces, the aggregate composition estimate comprising a plurality of element concentration esti-
mates comprising an element concentration estimate
for each element in the plurality of elements; and operating a data processor to i) approve that batch of
fragments when the aggregate composition estimate for
the plurality of shot blasted pieces falls within the
associated aluminum alloy composition range of the
category determined for that batch; and ii) otherwise
reject the fragments.

2. The method as defined in claim 1 further comprising,
for a particular manufacturer in the plurality of aluminum
alloy rim manufacturers, storing in the non-transient com-
puter-readable memory at least two different product desig-
nations for designating at least two different categories of
aluminum alloy rims in the plurality of aluminum alloy rims;
wherein, the at least two different product designations comprise a
first product designation for designating a first category
of aluminum alloy rims produced by that particular
manufacturer, and a second product designation for
designating a second category of aluminum alloy rims
produced by that particular manufacturer, the first cat-
egory of aluminum alloy rims and the second category
of aluminum alloy rims being different categories in the
plurality of aluminum alloy rim categories;

for each rim in the feed of aluminum alloy rims, operating
the data processor to determine the aluminum alloy rim
category for that aluminum alloy rim based on its serial
number, comprises, for at least a first kind of aluminum
alloy rims in the plurality of aluminum alloy rims and
for at least a second kind of aluminum alloy rims in the
plurality of aluminum alloy rims, determining the first
category of aluminum alloy rims for the first kind of
aluminum alloy rims and the second category of alu-
minum alloy rims for the second kind of aluminum
alloy rims;

for each rim in the first kind of aluminum alloy rims,
allocating that aluminum alloy rim comprises allocat-
ing that aluminum alloy rim to the first batch of
aluminum alloy rims;

for each rim in the second kind of aluminum alloy rims,
allocating that aluminum alloy rim comprises allocat-
ing that aluminum alloy rim to the second batch of
aluminum alloy rims;

supplying the fragments of the first batch and the frag-
ments of the second batch to the particular manufac-
turer comprises providing the first batch to the particu-
lar manufacturer together with an indication that the
first batch corresponds to the first category, and sepa-
rately providing the second batch to the particular
manufacturer together with an indication that the sec-
ond batch corresponds to the second category.

3. The method as defined in claim 1 further comprising:

when that batch of fragments is approved, providing that
batch of fragments to a downstream recycling process
to produce a target aluminum alloy; and when that batch of fragments is rejected, not providing
that batch of fragments to the downstream recycling
process to produce the target aluminum alloy.

4. A method of processing aluminum alloy rims, the
method comprising:

providing a feed of a plurality of aluminum alloy rims of
different compositions, each aluminum alloy rim in the
plurality of aluminum alloy rims having a serial num-
ber distinguishing that aluminum alloy rim from other
aluminum alloy rims in the plurality of aluminum alloy
rims;

storing in a non-transient computer-readable memory, a
plurality of aluminum alloy rim categories;

dividing the feed of aluminum alloy rims into a plurality
of batches of aluminum alloy rims by, for each rim in
the feed of aluminum alloy rims, scanning that alumi-
num alloy rim to determine the serial number of that
aluminum alloy rim;

based on the serial number, operating a data processor to
determine, from amongst the plurality of aluminum
alloy rim categories, an aluminum alloy rim category
for that aluminum alloy rim, wherein each batch of
aluminum alloy rims in the plurality of batches of
aluminum alloy rims corresponds to a category in the
plurality of aluminum alloy rim categories; and then, allocating that aluminum alloy rim to the batch of alumi-
num alloy rims corresponding to that aluminum alloy
rim category;

after dividing the feed of aluminum alloy rims into the
plurality of batches of aluminum alloy rims, separately
processing each batch of the plurality of batches of
aluminum alloy rims wherein for each batch of alumi-
num alloy rims of the plurality of batches of aluminum
alloy rims, separately processing that batch comprises
fragmenting the aluminum alloy rims of that batch into
fragments, and then cleaning the fragments, the clean-
ing including shot blasting the fragments; and then, the method further comprises, for each batch of the
plurality of batches of aluminum alloy rims, separately
supplying the fragments of that batch for recycling, further comprising, for a particular manufacturer in the
plurality of aluminum alloy rim manufacturers, storing
in the non-transient computer-readable memory at least
two different product designations for designating at
least two different categories of aluminum alloy rims in
the plurality of aluminum alloy rims; wherein, the at least two different product designations comprise a
first product designation for designating a first category
of aluminum alloy rims produced by that particular
manufacturer, and a second product designation for
designating a second category of aluminum alloy rims
produced by that particular manufacturer, the first cat-
egory of aluminum alloy rims and the second category
of aluminum alloy rims being different categories in the
plurality of aluminum alloy rim categories;

for each rim in the feed of aluminum alloy rims, operating
the data processor to determine the aluminum alloy rim
category for that aluminum alloy rim based on its serial
number, comprises, for at least a first kind of aluminum
alloy rims in the plurality of aluminum alloy rims and
for at least a second kind of aluminum alloy rims in the
plurality of aluminum alloy rims, determining the first
category of aluminum alloy rims for the first kind of
aluminum alloy rims and the second category of alu-
minum alloy rims for the second kind of aluminum
alloy rims;

for each rim in the first kind of aluminum alloy rims,
allocating that aluminum alloy rim comprises allocat-
ing that aluminum alloy rim to the first batch of
aluminum alloy rims;

for each rim in the second kind of aluminum alloy rims,
allocating that aluminum alloy rim comprises allocat-
ing that aluminum alloy rim to the second batch of
aluminum alloy rims;

supplying the fragments of the first batch and the frag-
ments of the second batch to the particular manufac-
turer comprises providing the first batch to the particu-
lar manufacturer together with an indication that the first batch corresponds to the first category, and separately providing the second batch to the particular manufacturer together with an indication that the second batch corresponds to the second category, further comprising storing in the non-transient computer-readable memory, a plurality of aluminum alloy composition ranges, the plurality of aluminum alloy composition ranges comprising, for each category in the plurality of categories of aluminum alloy rims, an associated aluminum alloy composition range for that category, the associated aluminum alloy composition range for that category comprising, for each element in a plurality of elements, an element range for that element;

wherein, for each batch of the plurality of batches of aluminum alloy rims, after shot blasting that batch of fragments, the method further comprises determining a plurality of estimated compositions by, for each fragment of a representative sample of fragments of that batch of fragments determining an estimated composition for that fragment comprising for each element in the plurality of elements, a concentration estimate for that element in that fragment;

determining from the plurality of estimated compositions, an aggregate composition estimate for the plurality of shot blasted pieces, the aggregate composition estimate comprising a plurality of element concentration estimates comprising an element concentration estimate for each element in the plurality of elements;

operating a data processor to i) approve that batch of fragments when the aggregate composition estimate for the plurality of shot blasted pieces falls within the associated aluminum alloy composition range of the category determined for that batch; and ii) otherwise reject the fragments.

5. The method as defined in claim 4 further comprising:

when that batch of fragments is approved, providing that batch of fragments to a downstream recycling process to produce a target aluminum alloy; and when that batch of fragments is rejected, not providing that batch of fragments to the downstream recycling process to produce the target aluminum alloy.

6. A method of processing aluminum alloy rims, the method comprising:

providing a feed of a plurality of aluminum alloy rims of different compositions, each aluminum alloy rim in the plurality of aluminum alloy rims having a serial number distinguishing that aluminum alloy rim from other aluminum alloy rims in the plurality of aluminum alloy rims;

storing in a non-transient computer-readable memory, a plurality of aluminum alloy rim categories;

dividing the feed of aluminum alloy rims into a plurality of batches of aluminum alloy rims by, for each rim in the feed of aluminum alloy rims, scanning that aluminum alloy rim to determine the serial number of that aluminum alloy rim;

based on the serial number, operating a data processor to determine, from amongst the plurality of aluminum alloy rim categories, an aluminum alloy rim category for that aluminum alloy rim, wherein each batch of aluminum alloy rims in the plurality of batches of aluminum alloy rims corresponds to a category in the plurality of aluminum alloy rim categories; and then, allocating that aluminum alloy rim to the batch of aluminum alloy rims corresponding to that aluminum alloy rim category;

after dividing the feed of aluminum alloy rims into the plurality of batches of aluminum alloy rims, separately processing each batch of the plurality of batches of aluminum alloy rims wherein for each batch of aluminum alloy rims of the plurality of batches of aluminum alloy rims, separately processing that batch comprises fragmenting the aluminum alloy rims of that batch into fragments, and then cleaning the fragments, the cleaning including shot blasting the fragments; and then, the method further comprises, for each batch of the plurality of batches of aluminum alloy rims, separately supplying the fragments of that batch for recycling, further comprising storing in the non-transient computer-readable memory, a plurality of aluminum alloy composition ranges, the plurality of aluminum alloy composition ranges comprising, for each category in the plurality of categories of aluminum alloy rims, an associated aluminum alloy composition range for that category, the associated aluminum alloy composition range for that category comprising, for each element in a plurality of elements, an element range for that element;

wherein, for each batch of the plurality of batches of aluminum alloy rims, after shot blasting that batch of fragments, the method further comprises determining a plurality of estimated compositions by, for each fragment of a representative sample of fragments of that batch of fragments determining an estimated composition for that fragment comprising for each element in the plurality of elements, a concentration estimate for that element in that fragment;

determining from the plurality of estimated compositions, an aggregate composition estimate for the plurality of shot blasted pieces, the aggregate composition estimate comprising a plurality of element concentration estimates comprising an element concentration estimate for each element in the plurality of elements;

operating a data processor to i) approve that batch of fragments when the aggregate composition estimate for the plurality of shot blasted pieces falls within the associated aluminum alloy composition range of the category determined for that batch; and ii) otherwise reject the fragments;

when that batch of fragments is approved, providing that batch of fragments to a downstream recycling process to produce a target aluminum alloy; and when that batch of fragments is rejected, not providing that batch of fragments to the downstream recycling process to produce the target aluminum alloy.

* * * * *